(12) United States Patent
Miyano

(10) Patent No.: US 6,775,714 B1
(45) Date of Patent: Aug. 10, 2004

(54) COMMUNICATION METHOD, COMMUNICATION APPARATUS, COMMUNICATION SYSTEM AND PROVIDING MEDIUM

(75) Inventor: Michio Miyano, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/744,114
(22) PCT Filed: May 19, 2000
(86) PCT No.: PCT/JP00/03233
§ 371 (c)(1),
(2), (4) Date: Apr. 5, 2001
(87) PCT Pub. No.: WO00/70841
PCT Pub. Date: Nov. 23, 2000

(30) Foreign Application Priority Data

May 19, 1999 (JP) .......................... 11/138960

(51) Int. Cl.[7] .............................................. G06F 3/00
(52) U.S. Cl. ................. 710/8; 710/9; 710/100; 370/431
(58) Field of Search ............... 710/8, 9, 10, 33, 710/100, 104, 105, 106, 313; 370/431, 912; 709/233

(56) References Cited

U.S. PATENT DOCUMENTS

| | | | |
|---|---|---|---|
| 5,689,244 A | | 11/1997 | Iijima et al. |
| 6,038,625 A | * | 3/2000 | Ogino et al. ............. 710/104 |
| 6,185,622 B1 | * | 2/2001 | Sato ........................... 709/233 |
| 6,366,964 B1 | * | 4/2002 | Shima et al. ................... 710/8 |
| 6,504,847 B1 | * | 1/2003 | Horlander ................... 370/431 |
| 6,578,095 B1 | * | 6/2003 | Tanaka et al. .............. 710/100 |
| 6,591,313 B1 | * | 7/2003 | Hata et al. ..................... 710/33 |

FOREIGN PATENT DOCUMENTS

| | | |
|---|---|---|
| CN | 1115143 A | 1/1996 |
| EP | 0 689 296 A2 | 12/1995 |
| JP | 8-18584 | 1/1996 |
| JP | 8-70486 | 3/1996 |
| JP | 10-229427 | 8/1998 |
| JP | 10-285196 | 10/1998 |

OTHER PUBLICATIONS

Canadian Laid–Open Applications, Dec. 24, 1995–Dec. 30, 1995, Canadian Patent Appln. No. 2,152,242, published Dec. 29, 1995.

* cited by examiner

Primary Examiner—Khanh Dang
(74) Attorney, Agent, or Firm—Frommer Lawrence & Haug LLP; William S. Frommer; Dennis M. Smid

(57) ABSTRACT

An object of this invention is to enable a lock transaction to be carried out between apparatuses connected through a bus such as IEEE 1394 method with fewer data transmission processings. If a register conditionally writable is mounted on a desired apparatus connected through the serial communication bus, when it is intended to write into an apparatus having this register through the bus from other apparatus, a value estimated to be written in the register is obtained by a predetermined processing and then, that value and a value desired to be written into the register are instructed directly so as to control the write into the register.

4 Claims, 21 Drawing Sheets

FIG. 5

| Offset | Name | Activity |
|---|---|---|
| 000h | State Clear | States And Control Information |
| 004h | State Set | States Clear Bit Is Set |
| 008h | Node ID | 16-Bit Node ID Is Indicated |
| 00Ch | Reset Start | Command Reset Is Started |
| 018-01Ch | Split Time-Out | Maximum Split Time Is Specified |
| 200h | Cycle Time | Cycle Time |
| 210h | Busy Time-Out | Retry Limit Is Specified |
| 21Ch | Bus Manager | Bus Manager ID Is Indicated |
| 220h | Bandwidth Use Condition | Bandwidth Which Can Be Allocated to Isochronous Communication Is Indicated |
| 224h-228h | Channel Use Condition | Use Condition of Each Channel Is Indicated |

FIG. 6

| | |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 7A oMPR

| Data Rate Capacity | Broadcast Channel Base | Sub-Extended Field | Main Extended Field | (Not Defined) | Output Plug Number |
|---|---|---|---|---|---|
| 2 | 6 | 8 | 8 | 3 | 5 (Bit) |

FIG. 7B oPCR [n]

| On-Line | Broadcast Connection Counter Value | P-P Connection Counter Value | (Not Defined) | Channel Number | Data Rate | Overhead ID | Payload |
|---|---|---|---|---|---|---|---|
| 1 | 6 | 6 | 2 | 6 | 2 | 4 | 10 (Bit) |

FIG. 7C iMPR

| Data Rate Capacity | (Not Defined) | Sub Extended Field | Main Extended Field | (Not Defined) | Input Plug Number |
|---|---|---|---|---|---|
| 2 | 6 | 8 | 8 | 3 | 5 (Bit) |

FIG. 7D oPCR [n]

| On-Line | Broadcast Connection Counter Value | P-P Connection Counter Value | (Not Defined) | Channel Number | (Not Defined) |
|---|---|---|---|---|---|
| 1 | 6 | 6 | 2 | 6 | 16 (Bit) |

FIG. 10

| address | General Sub-Unit Descriptor |
|---|---|
| | Content |
| 00 00₁₆ | Descriptor Length |
| 00 01₁₆ | |
| 00 02₁₆ | Generation ID |
| 00 03₁₆ | List ID Size |
| 00 04₁₆ | Object ID Size |
| 00 05₁₆ | Object Position Size |
| 00 06₁₆ | Root Object List Number (n) |
| 00 07₁₆ | |
| 00 08₁₆ ⋮ | Root Object List ID 0 |
| ⋮ | ⋮ |
| ⋮ | Root Object List ID n-1 |
| ⋮ | Length of Data Belonging to Sub-Unit |
| ⋮ | Guide Belonging to Sub-Unit |
| ⋮ | Data Length Particular to Manufacturer |
| ⋮ | Guide Particular to Manufacturer |

FIG. 11

| Allocation of Generation ID Value ||
|---|---|
| Generation ID | Meaning |
| $00_{16}$ | AV/C General Version 3.0 Specified |
| Other Value | Not Defined |

FIG. 12

| Allocation of List ID Value ||
|---|---|
| Value | List |
| $0000_{16}$ $0FFF_{16}$ | Not Defined |
| $1000_{16}$ $3FFF_{16}$ | Value Particular to Sub-Unit Type |
| $4000_{16}$ $FFFF_{16}$ | Not Defined |
| 1 $000_{16}$ | Value Particular to Sub-Unit Type |

Stack Model

FCP Command And Response

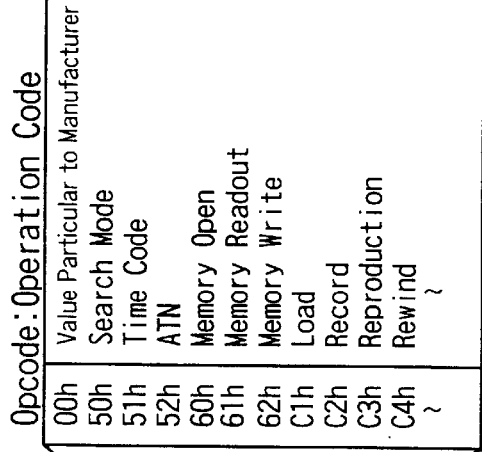

FIG. 17

| Command Type/Response | | |
|---|---|---|
| Command | 0000 | Control |
| | 0001 | Status |
| | 0010 | Specific Inquiry |
| | 0011 | Notify |
| | 0100 | General Inquiry |
| | 0101 | (Not Defined) |
| | ~ | |
| | 0111 | |
| Response | 1000 | Not Implemented |
| | 1001 | Accepted |
| | 1010 | Rejected |
| | 1011 | In Transition |
| | 1100 | Implemented/Stable |
| | 1101 | Changed |
| | 1110 | (Not Defined) |
| | 1111 | Interim |

Sub-Unit Type

| 00000 | Video Monitor |
| ~ | |
| 00011 | Disc Recorder/Player |
| 00100 | Tape Recorder/Player |
| 00101 | Tuner |
| 00111 | Video Camera |
| 01010 | BBS |
| 11100 | Value Particular to Manufacturer |
| 11101 | Not Defined |
| 11110 | (Specific Sub-Unit Type) |
| 11111 | Unit |

Opcode: Operation Code

| 00h | Value Particular to Manufacturer |
| 50h | Search Mode |
| 51h | Time Code |
| 52h | ATN |
| 60h | Memory Open |
| 61h | Memory Readout |
| 62h | Memory Write |
| C1h | Load |
| C2h | Record |
| C3h | Reproduction |
| C4h | Rewind |
| ~ | ~ |

FIG. 18A

Tape Recorder In Case
AV/C  Control  /Player    of ID0   Reproduction  Forward

| CTS= 0000 | C Type= 0000 | Sub-Unit Type= 00100 | id= 000 | Opcode= C3h | Operand= 75h |

FIG. 18B

Tape Recorder In Case
AV/C  Accepted  /Player    of ID0   Reproduction  Forward

| CTS= 0000 | Response= 1001 | Sub-Unit Type= 00100 | id= 000 | Opcode= C3h | Operand= 75h |

FIG. 20A

| Index | Destination Register | Lock Request Parameter | | Register Current Value |
|---|---|---|---|---|
| 1 | Channel Allocation L0 Register of IRM | arg_value | FFFFFFFF | 7FFFFFFF |
| | | data_value | 7FFFFFFF | |
| 2 | Bandwidth Allocation Register of IRM | arg_value | 00001333 | 000010AB |
| | | data_value | 000010AB | |
| 3 | IRD oPCR | arg_value | 80207C12 | 81207C12 |
| | | data_value | 81207C12 | |
| 4 | Deck iPCR | arg_value | 80200000 | 81200000 |
| | | data_value | 81200000 | |
| 5-1 | Channel Allocation L0 Register of IRM | arg_value | FFFFFFFF | 7FFFFFFF |
| | | data_value | 7FFFFFFF | |
| 5-2 | Channel Allocation L0 Register of IRM | arg_value | 7FFFFFFF | 3FFFFFFF |
| | | data_value | 3FFFFFFF | |
| 6-1 | Bandwidth Allocation Register of IRM | arg_value | 00001333 | 0000010AB |
| | | data_value | 000010AB | |
| 6-2 | Bandwidth Allocation Register of IRM | arg_value | 000010AB | 00000E23 |
| | | data_value | 00000E23 | |
| 7 | Deck oPCR | arg_value | 80217C12 | 81217C12 |
| | | data_value | 81217C12 | |
| 8 | IRD iPCR | arg_value | 80210000 | 81210000 |
| | | data_value | 81210000 | |

FIG. 20B

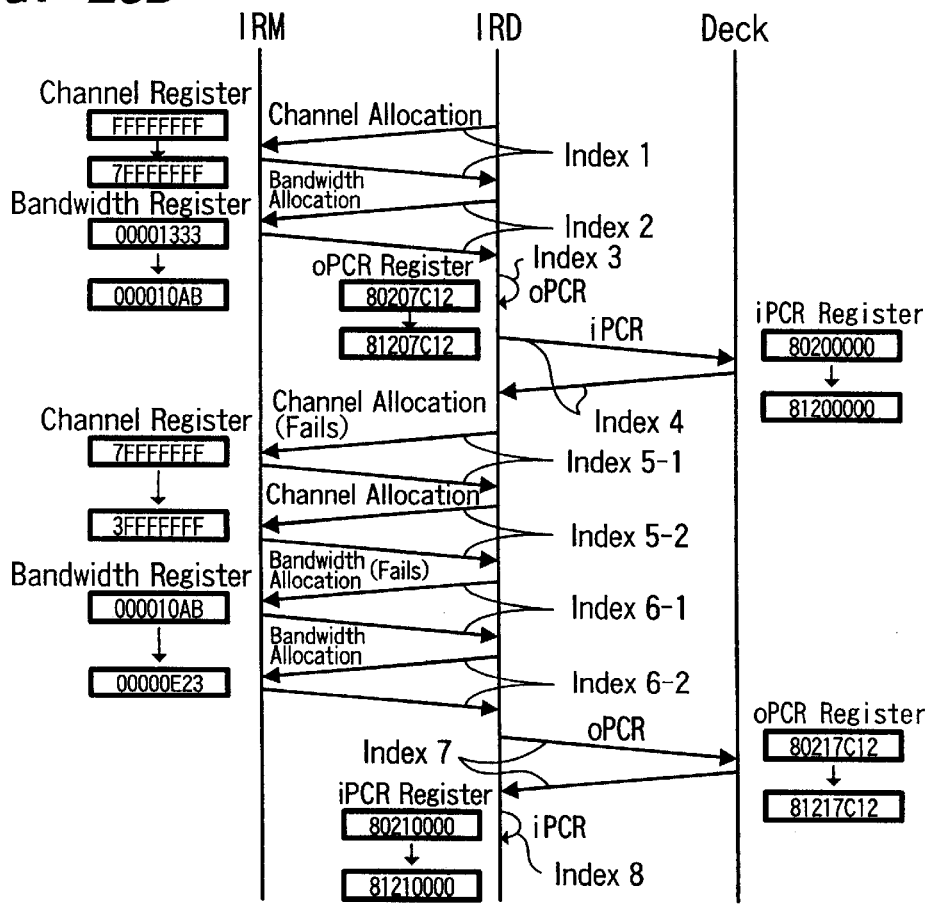

FIG. 22A

| Index | Destination Register | Lock Request Parameter | | Register Current Value |
|---|---|---|---|---|
| 1 | Channel Allocation L0 Register of IRM | arg_value | FFFFFFFF | 7FFFFFFF |
| | | data_value | 7FFFFFFF | |
| 2 | Bandwidth Allocation Register of IRM | arg_value | 00001333 | 000010AB |
| | | data_value | 000010AB | |
| 3 | IRD oPCR | arg_value | 80207C12 | 81207C12 |
| | | data_value | 81207C12 | |
| 4 | Deck iPCR | arg_value | 80200000 | 81200000 |
| | | data_value | 81200000 | |
| 5 | Channel Allocation L0 Register of IRM | arg_value | 7FFFFFFF | 3FFFFFFF |
| | | data_value | 3FFFFFFF | |
| 6 | Bandwidth Allocation Register of IRM | arg_value | 000010AB | 00000E23 |
| | | data_value | 00000E23 | |
| 7 | Deck oPCR | arg_value | 80217C12 | 81217C12 |
| | | data_value | 81217C12 | |
| 8 | IRD iPCR | arg_value | 80210000 | 81210000 |
| | | data_value | 81210000 | |

FIG. 22B

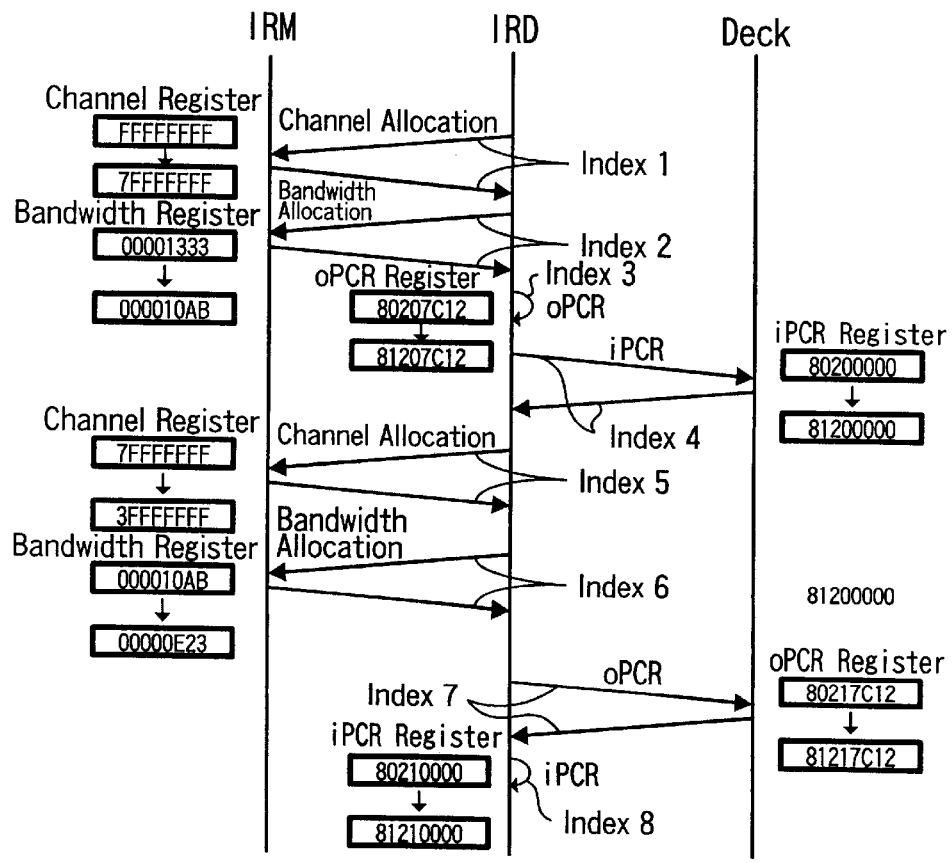

COMMUNICATION METHOD, COMMUNICATION APPARATUS, COMMUNICATION SYSTEM AND PROVIDING MEDIUM

TECHNICAL FIELD

The present invention relates to a communication method preferable for application in communication between apparatus connected through serial-bus based on, for example, IEEE1394 type, communication apparatus and communication system employing this communication method, and providing medium storing a program for carrying out this communication.

BACKGROUND ART

Audio visual apparatus capable of transmitting information through a network based on serial communication bus based on IEEE1394 type has been developed. By transmitting a predetermined command (AV/C command transaction set: hereinafter referred to as AV/C command) in this network, the AV apparatus connected to this network can be controlled. Details of the IEEE1394 type and AV/C command are described in AV/C Digital Interface Command Set General Specification publicized by 1394 Trade Association.

Communication using the IEEE1394 type bus includes a conditional operation called lock transaction. This lock transaction is used for set-up after a target apparatus connected through bus is locked and its content is investigated. That is, a transaction for communication between a request party and a response party through bus is specified and update of individual data is carried out at the response party according to this transaction.

For example, as shown in FIG. 1, a digital satellite broadcasting receiver (Integrated Receiver Decoder: IRD) 10 and, an audio deck 20 are connected through a bus 1 based on IEEE1394 type. Bi-directional connection is established between the audio deck 20, which is a target apparatus and the IRD 10 through isochronous channel by a lock transaction by a request from the IRD 10. Further, an apparatus having a function called IRM (Isochronous Resource Manager) is connected to the bus 1. This IRM may be either the IRD 10 or the deck 20.

The lock request (Lock Request) from a control apparatus (IRD 10 in FIG. 1) has two parameters [arg value] and [data value]. A current value of a register which it is intended to write-in is specified in the [arg value] and a value desired to write is specified in the [data value to try write].

A lock response (Lock Response) sent from a target apparatus corresponding to transmission of the request from the control apparatus has [old value] as a parameter. A current value of a register which it is intended to write-in is stored in this.

The control apparatus determines whether or not the response [old value] as parameter sent by the target apparatus is equal to the requested [arg value] as parameter. If they are equal, it is determined that write of the appropriate data has succeeded. If they are not equal, it is determined that the write has failed.

Such conditional write method is called comparison and exchange [compare & swap]. The reason why it is called [compare & swap] is that if the current value is compared with [arg value] and they are equal, it is exchanged with the [data value].

As described above, the conventional processing requires two actions, that is, a processing for reading out a value of a register to be written and a processing for converting that read out value to a value desired to be written. Thus, there is such a problem that it takes a number of operations and times to carry out the lock transaction.

DISCLOSURE OF THE INVENTION

An object of the present invention is to enable a lock transaction to be carried out between apparatus connected through such a bus as IEEE 1394 type with fewer data transmission processings.

According to a first invention, there is provided a communication method for communicating between apparatuses connected through a predetermined serial communication bus, wherein in case where a register conditionally writable is mounted in a predetermined apparatus connected through the serial communication bus, when it is intended to write in the apparatus having the register through the bus from other apparatus, a value estimated to be written in the register and a value to be written into the register are instructed so as to update a value written in the register. Consequently, when the value estimated to be written in the register coincides with the value actually written in the register, the register value can be updated to an instructed value immediately, so that the conditional write can be made to succeed with fewer data transmissions. Thus, network traffic can be reduced by that corresponding amount.

According to a second invention, there is provided a communication method as claimed in the first invention wherein the value estimated to be written in the register is a fixed value preliminarily set up. Consequently, by preparing a fixed value for each register type, a possibility that the value written in the register coincides with the estimated value is intensified, so that a possibility that conditional write is made to succeed with fewer data transmissions is intensified.

According to a third invention, there is provided a communication method as claimed in the first invention wherein the value estimated to be written in the register is a value of a register accessed last by the other apparatus. Consequently, unless access is made from other apparatus, the register value coincides so that write into the register is carried out. As a result, a possibility that conditional write is made to succeed with fewer data transmissions is intensified.

According to a fourth invention, there is provided a communication method as claimed in the third invention wherein when the serial communication bus is reset, the value of the register stored as a value of the register accessed last by the other apparatus is changed to a predetermined value and the value of the register is updated according to the changed value. Consequently, when the bus reset occurs, the conditional write can be carried out successfully.

According to a fifth invention, there is provided a communication method as claimed in the first invention wherein when the register depends on a value of other register, the value of the register is updated according to the value of the other register. Consequently, the possibility that the conditional write succeeds is further intensified.

According to a sixth invention, there is provided a communication method as claimed in the first invention wherein the value estimated to be written in the register is estimated by a predetermined processing. Consequently, the conditional write can be carried out successfully based on an estimation.

According to a seventh invention, there is provided a communication apparatus for communicating with a mating connected through a predetermined serial communication bus so as to control write into a conditionally writable register by communication through the serial communication bus, the communication apparatus comprising: a control means for setting the value estimated to be written into the register and the value to be written into the register; and a transmitting means for transmitting the value estimated to be written and the value to be written, these values being set up by the control means, to the mating. Consequently, the conditional write into a register of the mating connected through the bus can be carried out successfully with fewer data transmissions.

According to an eighth invention, there is provided a communication apparatus as claimed in the seventh invention wherein the value estimated to be written in the register set up by the control means is a fixed value set preliminarily. Consequently, by preparing the fixed value for each type of the register, the possibility that the value written in the register coincides with the estimated value is intensified, so that the possibility that the conditional write can be carried out successfully with fewer data transmissions is also intensified.

According to a ninth invention, there is provided a communication apparatus as claimed in the seventh invention further comprising a storage means for storing a value of a register accessed last by the transmitting means, wherein the value estimated to be written in the register set up by the control means is a value of a register accessed last, stored in the storage means. Consequently, unless access is made from other apparatus, the register value coincides so that the write into the register is carried out. As a result, the possibility that the conditional write can be carried out successfully with fewer data transmissions is intensified.

According to a tenth invention, there is provided a communication apparatus as claimed in the ninth invention wherein when the control means detects a bus reset, the value of the register stored in the storage means is changed to a predetermined value and the value of the register is updated according to the changed value. Consequently, when the bus reset occurs also, the conditional write can be carried out successfully immediately.

According to an eleventh invention, there is provided a communication apparatus according to the seventh invention wherein the register is a register depending on a value of other register and the control means updates the value of the register according to the value of the other register. Consequently, the possibility that the conditional write can be carried out successfully is further intensified.

According to a twelfth invention, there is provided a communication apparatus as claimed in the seventh invention wherein the value estimated to be written in the register set up by the control means is a value estimated by a predetermined processing. Consequently, the conditional write can be made successfully based on an estimation.

According to a thirteenth invention, there is provided a communication system for communicating between a first apparatus and a second apparatus connected through a predetermined serial communication bus, the second apparatus having a conditionally writable register by communication from the first apparatus through the serial communication bus, the first apparatus comprising: a control means for setting the value estimated to be written into the register and the value to be written into the register; and a transmitting means for transmitting the value estimated to be written and the value to be written, these values being set up by the control means, to the mating, the second apparatus having a control means for, when a value estimated to be written in the register instructed from the first apparatus coincides with a value written in the register, updating to a value instructed as a value to be written. Consequently, a communication system in which the conditional write in the register of the second apparatus connected through the bus with fewer data transmissions from the first apparatus can be secured.

According to a fourteenth invention, there is provided a providing medium for providing a program storing a communication procedure for communicating between apparatuses connected through a predetermined serial communication bus, wherein in case where a register conditionally writable is mounted in a predetermined apparatus connected through the serial communication bus, when it is intended to write in the apparatus having the register through the bus from other apparatus, a value estimated to be written in the register and a value to be written into the register are instructed so as to update a value written in the register. Consequently, by mounting a program stored in this medium, the conditional write in the register can be carried out successfully with fewer data transmissions.

BRIEF DESCRIPTION OF THE DRAWINGS

FIG. 5 is an explanatory diagram showing examples of position, name and activity of major CRS.

FIG. 6 is an explanatory diagram showing an example of plug control register structure.

FIGS. 7A–D are explanatory diagrams showing examples of the structures of oMPR, oPCR, iMPR, iPCR.

FIG. 10 is an explanatory diagram showing an example of descriptor data structure.

FIG. 11 is an explanatory diagram showing an example of generator ID shown in FIG. 10.

FIG. 12 is an explanatory diagram showing an example of list ID of FIG. 10.

FIG. 17 is an explanatory diagram showing an example of the AV/C command.

FIGS. 18A, B are explanatory diagrams showing examples of command and response in the AV/C command.

FIGS. 20A, B are explanatory diagrams showing an example of sequence according to a first embodiment of the present invention.

FIGS. 22A, B are explanatory diagrams showing an example of sequence according to a second embodiment of the present invention.

BEST MODE FOR CARRYING OUT THE INVENTION

Hereinafter, the first embodiment of the present invention will be described.

Figure 1:
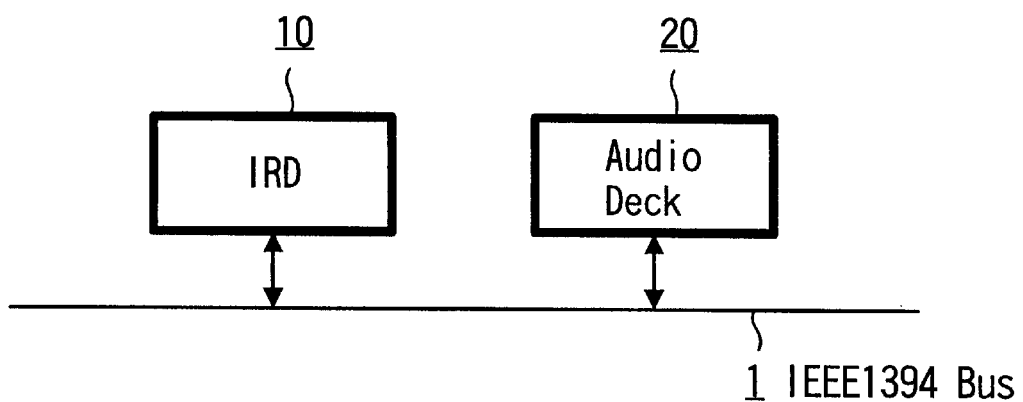
FIG. 1 is a block diagram showing an example of connection of plural apparatuses through a serial communication bus.
Figure 2:
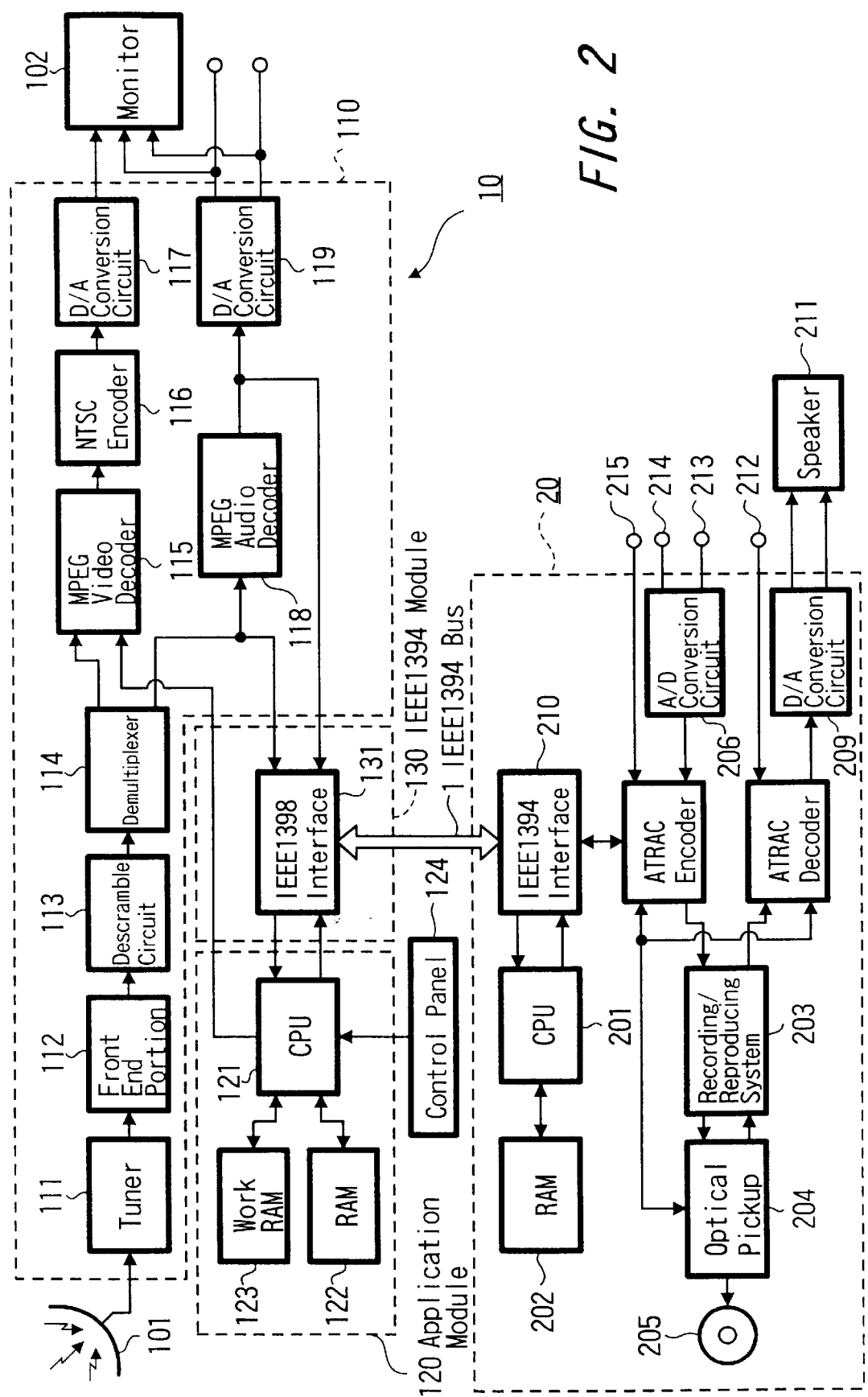
FIG. 2 is a block diagram showing an example of system structure according to an embodiment of the present invention.

First, an example of structure of a network system to which the present invention is applied will be described with reference to FIG. 2. In this network system, plural apparatuses are connected through serial data bus (hereinafter referred to just as bus) 1 based on IEEE1394 type, which is a digital communication control bus. FIG. 2 shows an example in which two AV apparatuses 10, 20 are connected through the bus 1. As an apparatus to be connected to the bus 1, digital satellite broadcasting receiver (integrated receiver decoder: IRD) 10 having a terminal for connecting to the IEEE1394 type bus and audio deck 20 are prepared in this example. The audio deck 20 is an apparatus for recording or reproducing audio data using magneto-optic disc called MD (mini disc) or an optic disc.

An example of a concrete structure of an IRD 10 and an audio deck 20 shown in FIG. 2 will be described. In a receiving module 110 of the IRD 10, a tuner 111 receives a signal from a predetermined transponder of satellite corresponding to an instruction from the CPU 131 and supplies that signal to a front end portion 112. The front end portion 112 demodulates a signal supplied from the tuner 111 and supplies the demodulation signal to a descramble circuit 113.

The descramble circuit 113 descrambles data supplied from a front end portion 112 based on cipher key information about subscription channel memorized in an IC card (not shown) mounted on a receiving module 110 and supplies its result to a demultiplexer 114. The demultiplexer 114 rearranges the supplied data for each channel, fetches a channel component corresponding to an instruction (instruction from user) from a CPU 131, outputs a video stream comprised of video packet to MPEG (Moving Picture Expers Group) video decoder 115 and outputs audio stream comprised of audio packet to an MPEG audio decoder 118.

The MPEG video decoder 115 decodes inputted video stream and outputs to an NTSC encoder 116. The NTSC encoder 116 converts inputted video data to NTSC type video data and further supplies it to a digital/analog conversion circuit 57, which converts digital data to analog video signal. After that, it is supplied to a monitor 102, which displays the data.

The MPEG audio decoder 118 decodes audio stream supplied from the demultiplexer 114 based on the MPEG type, restores the PCM (Pulse Code Modulation) prior to compression encoding and then, supplies to a digital/analog conversion circuit 119. If the PCM audio data is comprised of, for example, 2-channel data, the digital/analog conversion circuit 119 converts that audio data to left channel analog audio signal and right channel analog audio signal, supplies them to a speaker (not shown) of the monitor 102 and makes the speaker output.

According to this example, an output of the MPEG audio decoder 118 is supplied to the IEEE1394 interface 131 in the IEEE1394 module 130 and sent to the IEEE1394 type bus 1 through the IEEE1394 interface 131. Then, the data is transmitted to a mating apparatus connected to the bus 1 under a control of the CPU 121. The configuration of data to be transmitted through the bus 1 will be described later.

An application module 120 is comprised of the CPU 121 for controlling respective portions of the IRD 10, RAM 122 and work RAM 123. A control panel 124 is connected to the CPU 121.

A program or the like is developed in the RAM 122 appropriately from the CPU 121. Data necessary for the CPU 121 to carry out various processings is stored in the work RAM 123 as required. The IEEE1394 module 130 is composed of IEEE1394 type interface 131 for bus line in this case.

Next, a structure of the audio deck 20, which is a target apparatus for communication with the IRD 10, will be described. The CPU 201 in the audio deck 20 controls respective portions in the deck 20. Data necessary for the CPU 201 to carry out various processings is stored in the RAM 202 as required. The IEEE1394 interface 210 carries out interface processing for the IEEE 1394 bus 1. The IEEE1394 interface 210 sends control data supplied from the IRD 10 to the CPU 201 through the bus 1 and sends audio data to an ATRAC (Adaptive Transform Acoustic Coding) encoder 207.

The ATRAC encoder 207 encodes audio data inputted from the IEEE1394 interface 210 or a terminal 125 under a control of the CPU 201 or digital data gained by converting analog audio signal of right and left channels inputted from terminals 213, 214 by means of an analog/digital conversion circuit 206 at a high efficiency according to the ATRAC method and then, supplies its result to a recording/reproducing system 203 as a recording audio data. The CPU 201 controls recording operations of the recording/reproducing system 203 and an optical pickup 204 based on control data supplied from the IRD 10 through the IEEE1394 interface 210. The recording/reproducing system 203 adds an error correction code to audio data, carries out a predetermined modulation, and supplies to the optical pickup 204 so that it is recorded in a specified region of a magneto-optic disc (mini disc) 205.

Data reproduced from the magneto-optic disc 205 by the optical pickup 204 undergoes error correction processing and a predetermined demodulation processing by the recording/reproducing system 203. After that, it is supplied to the ATRAC decoder 208. The ATRAC decoder 208 decodes inputted reproduced data according to the ATRAC method and outputs its digital reproduced data out of a terminal 212. Alternatively, the reproduced data is converted to left channel analog audio signal and right channel analog audio signal by a digital/analog conversion circuit 209 and outputted through a speaker 211.

The respective apparatuses 10, 20 having such a structure and connected to the bus 1 are called unit. Information stored in each unit can be controlled by reading or writing using a command specified by the AV/C command between the units. Respective functions possessed by each unit are called sub-unit.

Each unit connected to the bus 1 is called node (node) and node ID is set up. A sender and receiver of data on the bus are specified based on the node ID. When a new apparatus is connected to the bus 1 or it is detected that a connected apparatus is removed from the bus, bus reset is executed so that a processing for setting up the node ID again is carried out. Therefore, when the bus reset occurs, the node IDs of respective apparatuses may be changed.

Establishment and release of connection to be carried out between apparatuses already connected to each other through the IEEE1394 type cable is not carried out by connecting or removing a physical cable, but by logical rewrite of register in the bus. The register mentioned here includes a node channel allocation register (CHANNELS AVAILABLE HI register, CHANNELS AVAILABLE LO register) which functions as the IRM, a bandwidth allocation register (BANDWIDTH AVAILABLE register) and input plug register and output plug register for the IRD 10 and deck 20, which are data input/output apparatuses. These registers are registers allowing write by conditional operation called lock transaction (Lock Transaction). That is, it is necessary to send and receive data between a write side and a receive side to decide that the write has succeeded because condition is satisfied when write into the register is tried.

Next, a concrete configuration of data transmission through the IEEE1394 type bus, which carries out data transmission by the above described processing, will be described with reference to FIGS. 3–18.

Figure 3:
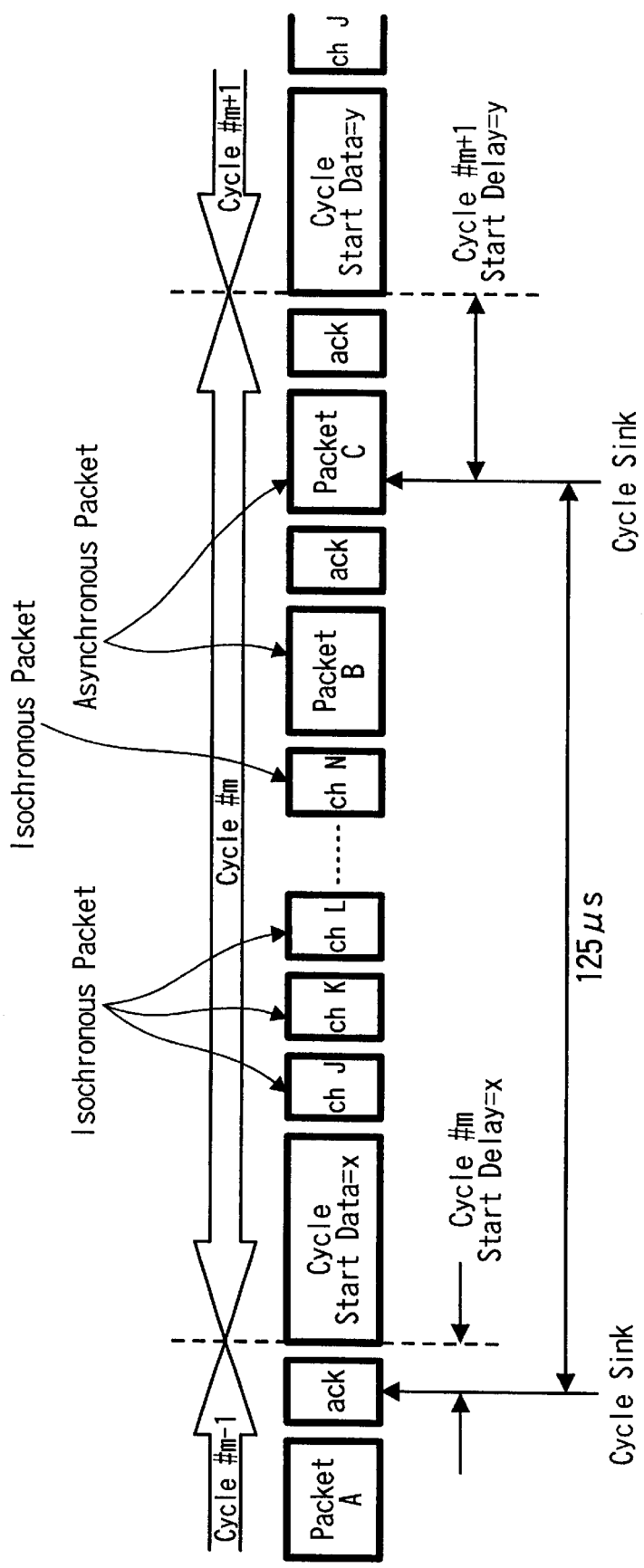
FIG. 3 is an explanatory diagram showing a frame structure specified by the IEEE1394 type.

FIG. 3 is a diagram showing a cycle structure of data transmission in apparatus connected via the IEEE1394. In the IEEE1394, data is divided to packets and transmitted by time division method with a cycle of 125 $\mu$S as a reference value. This cycle is produced by a cycle start signal supplied from a node (any apparatus connected to the bus) having a cycle master function. The isochronous packet secures a bandwidth (although this is a time unit, it is called bandwidth) necessary for transmission from a head of all cycles. Therefore, in the isochronous transmission, transmission of data in a predetermined time interval is ensured. However, acknowledgment from a receiver is not carried out and there is no system for protecting from a transmission error, which may occur, so that at this time, this data is lost. In asynchronous transmission in which a node securing the bus as a result of arbitration sends an asynchronous packet in a time interval not used for isochronous transmission for each cycle, a secure transmission is ensured by using acknowledge and retry. However, transmission timing is not made constant.

For a predetermined node to carry out isochronous transmission, that node must correspond to the isochronous function. Further, at least one of nodes corresponding to the isochronous function must possess a cycle master function. Further, at least one of the nodes connected to the IEEE1394 serial bus must possess a function of the isochronous resource manager.

Figure 4:
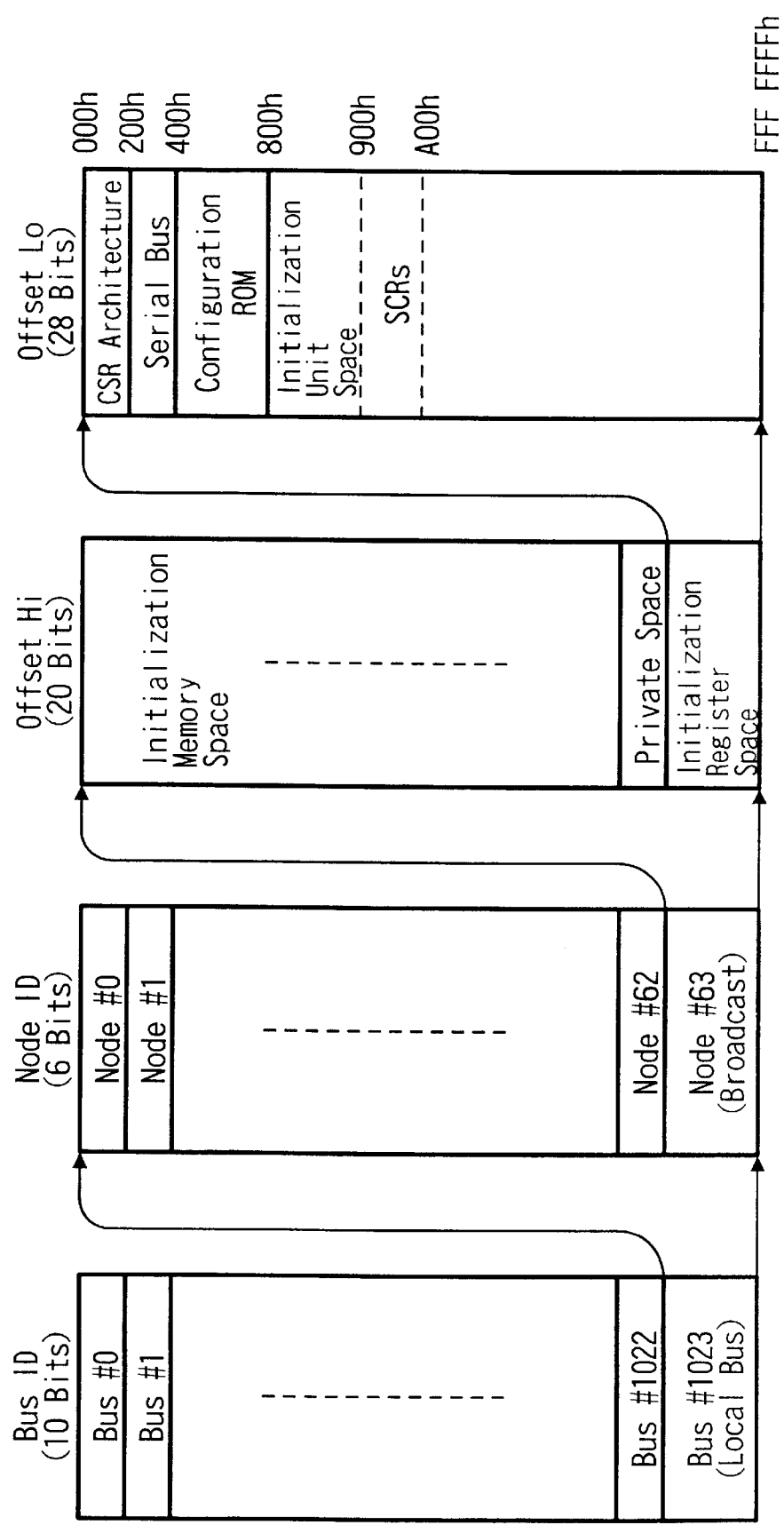
FIG. 4 is an explanatory diagram showing an example of the structure of address space of CRS architecture.

The IEEE 1394 is based on CSR (Control&Status Register) architecture having an address space of 64 bits specified by ISO/IEC13213. FIG. 4 is a diagram showing a structure of an address space of CSR architecture. The upper 16 bits are a node ID for indicating a node on each IEEE1394 while the remaining 48 bits are used for specifying an address space given to each node. The upper 16 bits are divided to 10 bits for bus ID and 6 bits of physical ID (node ID in a narrow sense). Because a value making all the bits 1 is used for a special purpose, 1023 buses and 63 nodes can be specified. The node ID is given again when a bus reset is carried out. The bus reset is generated when the configuration of an apparatus connected to the bus 1 is changed. For example, if any apparatus connected to the bus 1 is removed or it is recognized that a new apparatus is connected to the bus 1, the bus reset is executed.

A space specified by upper 20 bits of 256-tera byte address space specified by lower 48 bits is divided to an initialization register space of 2048 bytes (Initial Register Space) for use in a register specified for CSR, a register specified for the IEEE 1394 or the like, private space (Private Space), initialization memory space (Initial Memory Space) and the like. If the space specified by the upper 20 bits is an initialization register space, a space specified by the lower 28 bits is used as a configuration ROM (Configuration read only memory), an initialization unit space (Initial Unit Space) for use in application particular to a node, a plug control register (Plug Control Register (PCRs)) and the like.

FIG. 5 is a diagram for explaining offset addresses, names and activities of major CSRs. An offset in FIG. 5 indicates an offset address from FFFFF0000000h (a number having h at its last indicates hexadecimal notation) in which the initialization register space begins. Bandwidth available register (Bandwidth available register) having the offset 220h indicates a bandwidth which can be allocated to isochronous transmission and only a value of a node operating as an isochronous resource manager is valid. That is, although the CSR shown in FIG. 4 is possessed by each node, that possessed by the isochronous resource manager is valid for the bandwidth available register. In other words, the bandwidth available register is substantially possessed by only the isochronous resource manager. In the bandwidth available register, a maximum value is stored if no bandwidth is allocated to the isochronous transmission and that value is decreased each time when the bandwidth is allocated.

Respective bits in the channel available register (Channels Available Register) of offset 224h–228h correspond to channel number of 0–63. When the bit is 0, it indicates that that channel has been already allocated. Only a channel available register of a node acting as the isochronous resource manager is valid.

Returning to FIG. 4, a configuration ROM based on general ROM (read only memory) format is disposed at address 200h–400h in the initialization register space. Bus info block, root directory and unit directory are disposed in the configuration ROM. An ID number indicating a manufacturer of apparatus is stored in company ID (Company ID) in the bus info block. A unique ID in the world not overlapping that of other apparatus, inherent of that apparatus, is stored in a chip ID (Chip ID).

To control input/output of apparatus through an to interface, the node has PCR (Plug Control Register) specified by the IEC 1883 in address 900h–9FFh in the initial unit space shown in FIG. 4. This is an entity of concept of plug in order to form a signal path logically analogous to analog interface. FIG. 6 is a diagram for explaining the configuration of the PCR. The PCR has oPCR (output Plug Control Register) indicating output plug and iPCR (input Plug Control Register) indicating input plug. Additionally, the PCR has registers oMPR (output Master Plug Register) and iMPR (input Master Plug Register) indicating output plug or input plug information inherent of each apparatus. Each apparatus does not has a plurality of each of the oMPRs and iMPRs but can has plural oPCRs and iPCRs corresponding to each plug depending on the capacity thereof. The PCR shown in FIG. 6 has 31 oPCRs and iPCRs. Isochronous data flow is controlled by operating a register corresponding to these plugs.

FIGS. 7A–D are diagrams showing the configurations of the oMPR, oPCR, iMPR and iPCR. FIG. 7A shows the configuration of the oMPR, FIG. 7B shows the configuration of the oPCR, FIG. 7C shows the configuration of the iMPR and FIG. 7D shows the configuration of the iPCR. A code indicating maximum transmission speed of isochronous data which a given apparatus can send or receive is stored in 2-bit data rate capability of the MSB side of the oMPR and iMPR. A broadcast channel base (broadcast channel base) of oMPR specifies the number of a channel for use in broadcast output (broadcast output).

An output plug number possessed by a given apparatus, that is a value indicating the number of the oPCR is stored in the output plug number (number of output plugs) of 5 bits on the LSB side of the oMPR. An input plug number possessed by a given apparatus, that is a value indicating the number of the iPCR is stored in the input plug number (number of input plugs) of 5 bits on the LSB side of the iMPR. A main extended field and a sub extended field are regions defined for future extension.

On-line (on-line) of the MSB of the oPCR and iPCR indicates use condition of a plug. That is, it indicates that that plug is on-line if the value is 1 and that the plug is off-line if the value is 0. A value of the broadcast connection counter (broadcast connection counter) of the oPCR and iPCR indicates presence (1) or absence (0) of the broadcast connection. A value possessed by a point-to-point connection counter (point-to-point connection counter) having a 6-bit width of the oPCR and iPCR indicates a number of the point-to-point connections (point-to-point connection) having that plug. The point-to-point connection (so-called p-p connection) is a connection for carrying out transmission only between a particular node and other particular node.

A value possessed by a channel number (channel number) having a 6-bit width of the oPCR and iPCR indicates a number of isochronous channel to which that plug is to be connected. A value of data rate (data rate) having a 2-bit width of the oPCR indicates a current transmission speed of isochronous data packet outputted from that plug. A code stored in overhead ID (overhead ID) having a 4-bit width of the oPCR indicates a bandwidth of isochronous communication. A value of payload (payload) having a 10-bit width of the oPCR indicates a maximum value of data contained in the isochronous packet which that plug is capable of handling.

Figure 8:
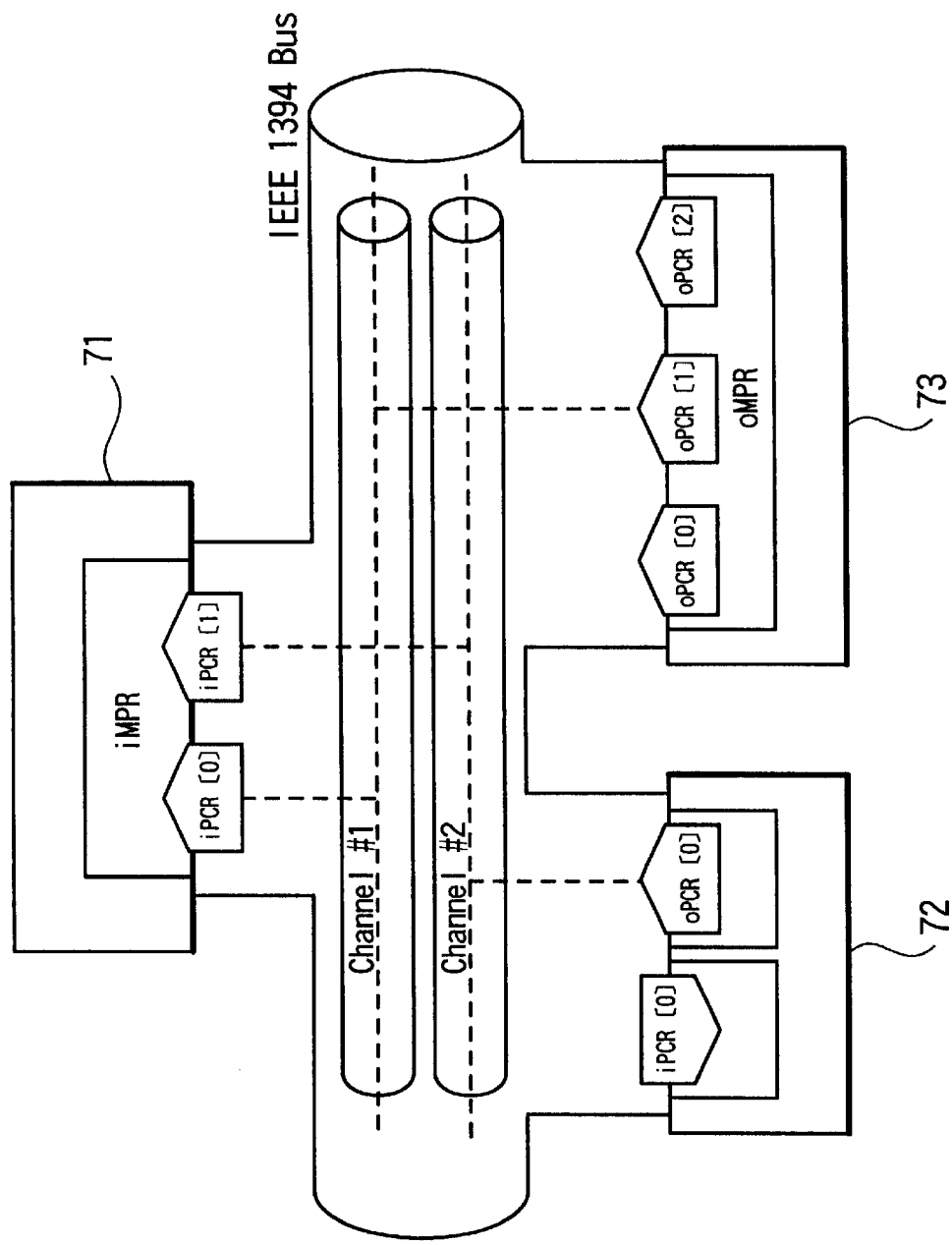
FIG. 8 is an explanatory diagram showing an example of relation among plug, plug control register and communication channel.

FIG. 8 is a diagram showing a relation among the plug, plug control register, and isochronous channel. Here, apparatuses connected to the IEEE1394 type bus are indicated by AV devices (AV-device) 71–73. Isochronous data whose channel is specified by oPCR[1] of oPCR[0]–oPCR[2] in which transmission speed and the number of the oPCRs are specified by the oMPR of the AV device 73 is sent to channel #1 of the IEEE1394 serial bus. Of the iPCR[0] and iPCR[1] in which transmission speed and number of iPCRs are specified by the iMPR of the AV device 71, the AV device 71 reads isochronous data sent to the channel #1 of the IEEE1394 serial bus specified by iPCR[0]. Likewise, a AV device 72 sends isochronous data to the channel #2 specified by the oPCR[0] and then, the AV device 71 reads the isochronous data from the channel #2 specified by the iPCR[1].

In this way, data transmission is carried out between apparatuses connected through the IEEE 1394 serial bus. In a system of this example, the respective apparatuses are controlled or the status thereof is determined using the AV/C command set specified as a command for control of an apparatus connected through the IEEE 1394 serial bus. Next, this AV/C command set will be described.

Figure 9:
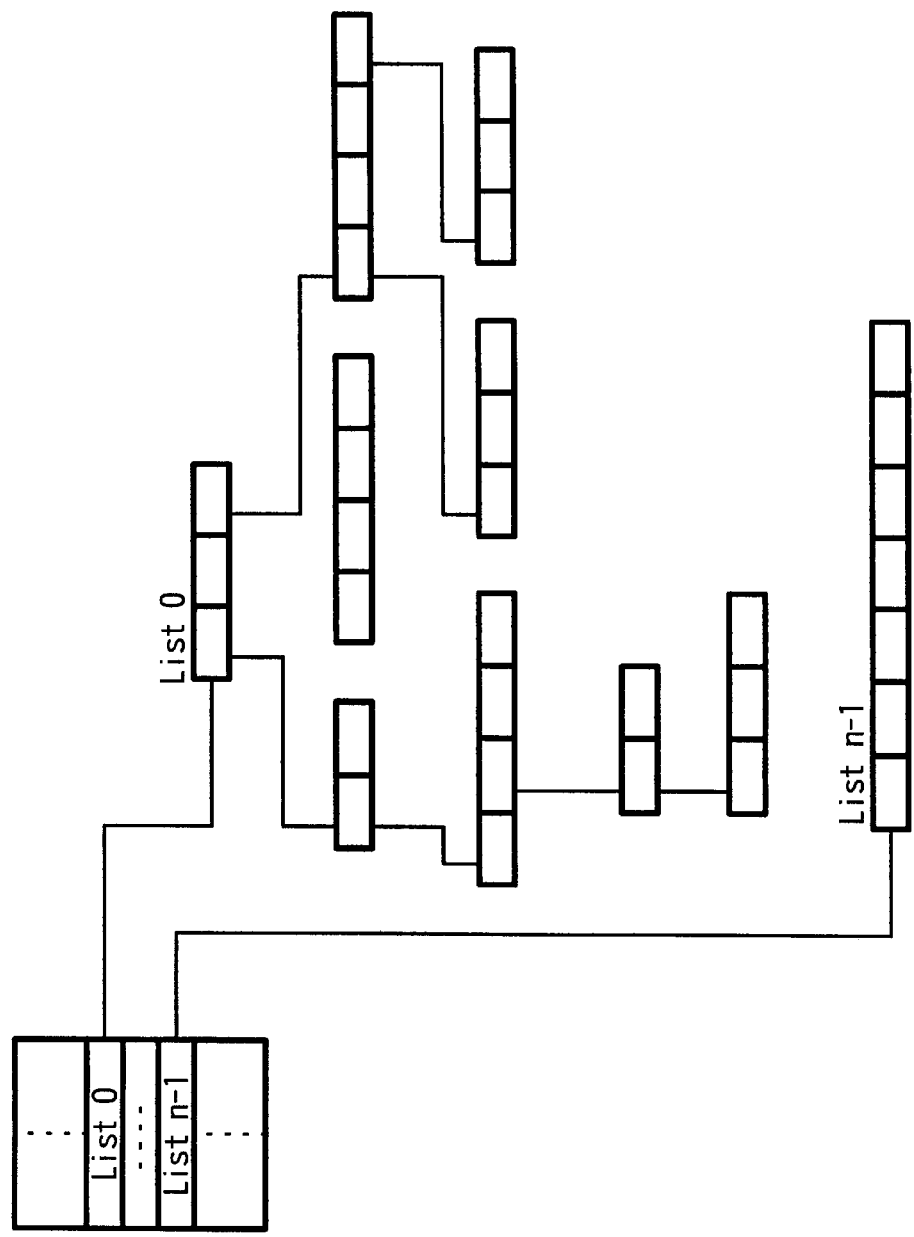
FIG. 9 is an explanatory diagram showing an example of data structure based on descriptor hierarchical structure.

First, a data structure of sub-unit identifier descriptor (Sub-unit Identifier Descriptor) in the AV/C command set for use in the system of this example will be described with reference to FIGS. 9–12. FIG. 9 shows data structure of the sub-unit identifier descriptor. As shown in FIG. 9, the sub-unit identifier descriptor is formed of hierarchical list. On this list, for example, a tuner indicates a channel capable of receiving and a disc indicates a music recorded therein. A uppermost layer list in the hierarchical structure is called root list. For example, list 0 is a root for lower lists. Other lists can be root list. The root lists exist by the same number as objects. The object mentioned here means each channel or the like in digital broadcasting if an AV apparatus connected to the bus is a tuner. Further, all lists in a hierarchical structure possess common information.

FIG. 10 shows a format of the general sub-unit descriptor (The general Sub-unit Identifier Descriptor). Attribute information about the function is described in the sub-unit descriptor as a content. A descriptor length (descriptor length) field does not contain a value of the field itself. A generation ID (generation ID) indicates a version of the AV/C command set and that value is, for example, "00h" (h is a hexadecimal number). Here, "00h" indicates that as shown in FIG. 11, data structure and command are version 3.0 of the AV/C general specification (General Specification). Further, as shown in FIG. 11, all values except the "00h" are secured for future specification.

A list ID size (size of list ID) indicates a byte number of list ID. An object ID size (size of object ID) indicates a byte number of object ID. An object position size (size of object position) indicates a position (byte number) in a list used for reference during control. A root object list number (number of root object list) indicates a number of root object lists. A root object list ID (root object list id) indicates an ID for identifying an uppermost root object list in each independent hierarchical structure.

A data length belonging to sub-unit (sub-unit dependent length) indicates a byte number of data (sub-unit dependent information) field belonging to subsequent sub-unit. A data field belonging to the sub-unit is a field indicating information inherent of function. Data length of manufacturer (manufacturer dependent length) indicates a byte number of data (manufacturer dependent information) field of subsequent manufacturer. Data of manufacturer is a field indicating specification information of vender (manufacturer). If there is no data about manufacturer in the descriptor, that field does not exist.

FIG. 12 shows an allocation range of the list ID shown in FIG. 10. As shown in FIG. 12, "0000h–0FFFh" and "4000h–FFFFh" are secured preliminarily as an allocation range for future specification. "1000h–3FFFh" and "10000h-list ID maximum value" are prepared to identify dependent information of function type.

Figure 13:
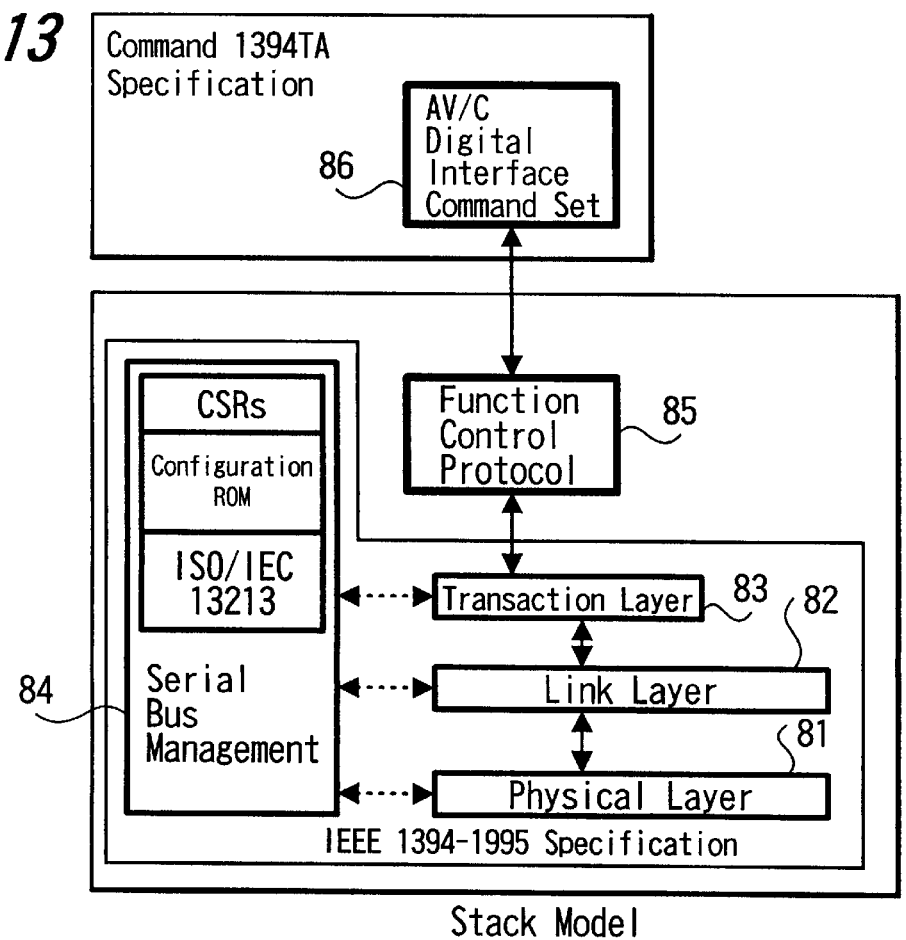
FIG. 13 is an explanatory diagram showing an example of AV/C command stack model.

Next, an AV/C command set for use in the system of this example will be described with reference to FIGS. 13–18A, B. FIG. 13 indicates a stack model of the AV/C command set. As shown in FIG. 13, a physical layer 81, a link layer 82, a transaction layer 83, and a serial bus management 84 are based on the IEEE 1394 FCP (Function Control Protocol) 85 is based on the IEC61883. The AV/C command set 86 is based on 1394TA specification.

Figure 14:
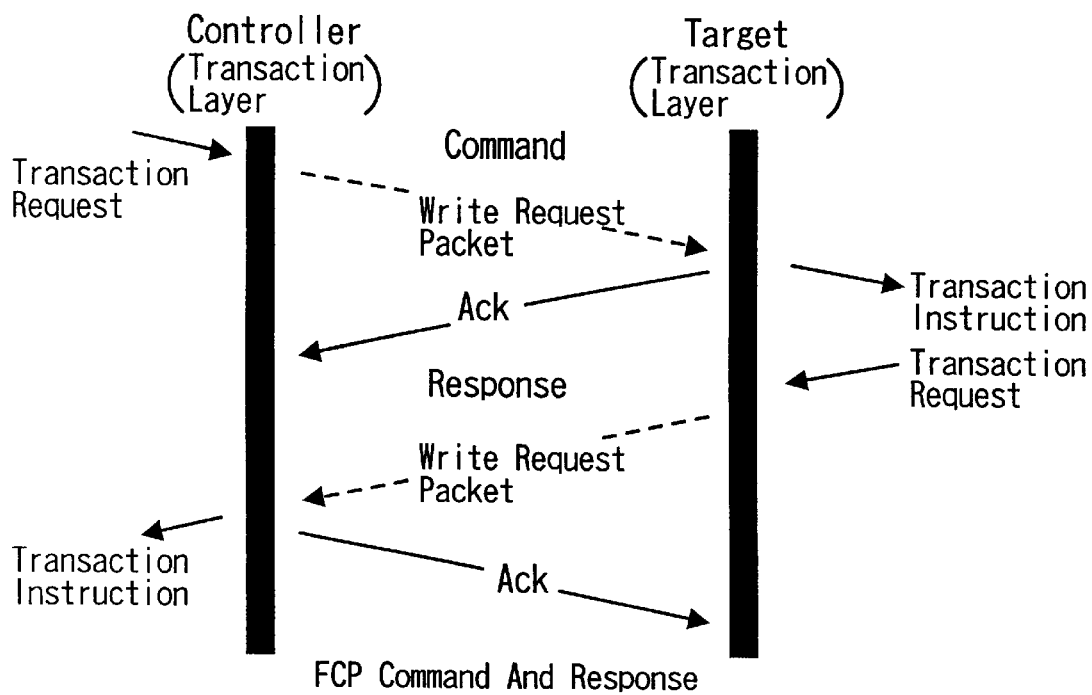
FIG. 14 is an explanatory diagram showing a relation between command and response in the AV/C command.

FIG. 14 is a diagram for explaining command and response in the FCP 85 of FIG. 13. The FCP is a protocol for controlling an apparatus (node) on the IEEE1394 type bus. As shown in FIG. 14, a control side is controller and a side to be controlled is target. Transmission and response of the FCP command are carried out between nodes using write transaction of the IEEE1394 asynchronous communication. A target receiving data sends back acknowledge to the controller for confirming reception.

Figure 15:
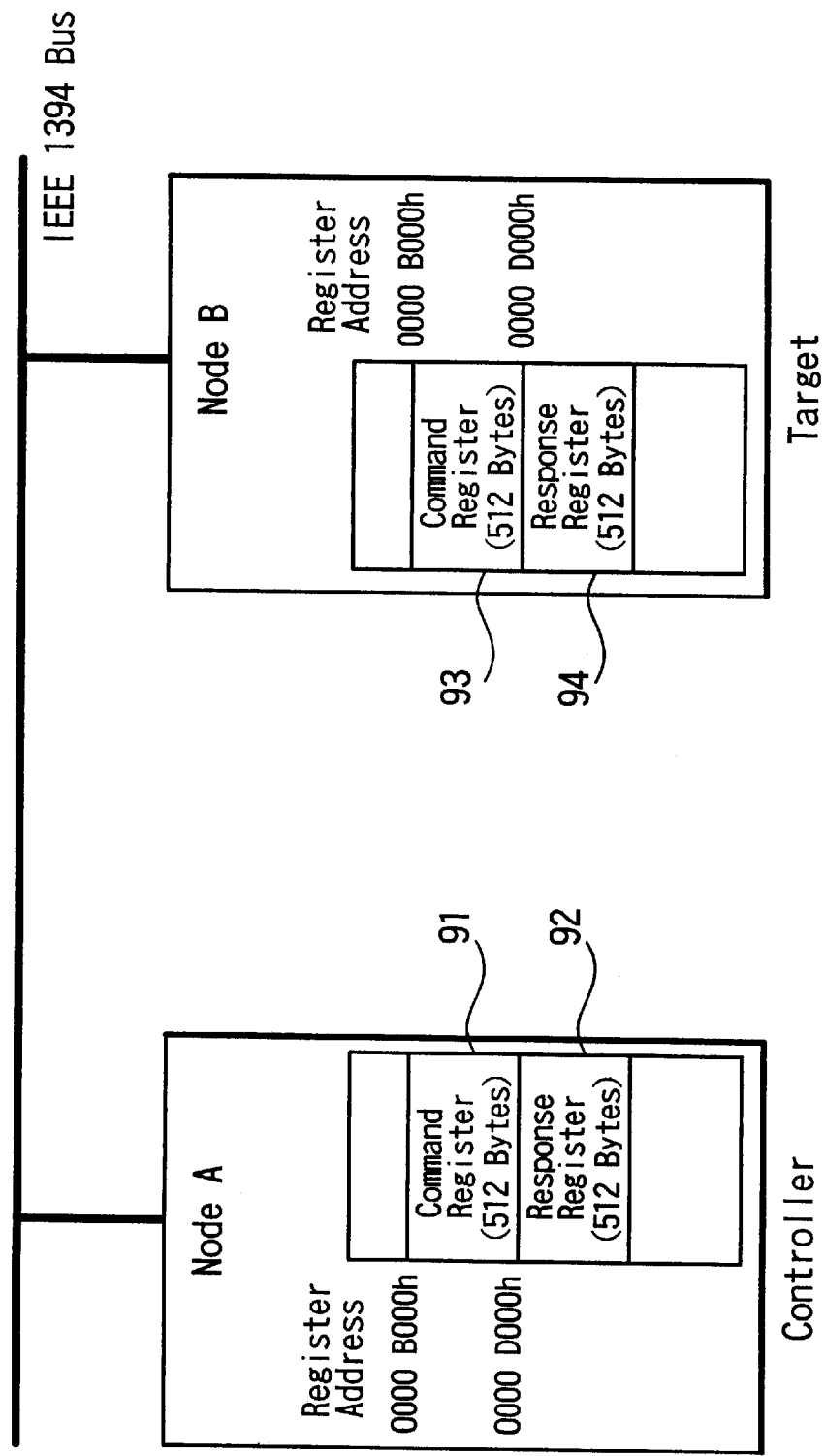
FIG. 15 is an explanatory diagram showing a relation between command and response in the AV/C command further in detail.

FIG. 15 is a diagram for explaining a relation between command and response of the FCP shown in FIG. 14 further in detail. A node A and a node B are connected through the IEEE1394 bus. The node A is a controller and the node B is a target. In both the node A and node B, a 512-byte command register and a 512-byte response register are prepared respectively. As shown in FIG. 15, if the controller writes a command message into the command register 93 of the target, that command is notified. If the target writes a response message into the response register 92 of the controller, that response is notified. For these two messages, control information is sent or received. Types of the command sets transmitted by the FCP is described in the CTS in data field of FIG. 16 which will be described later.

Figure 16:
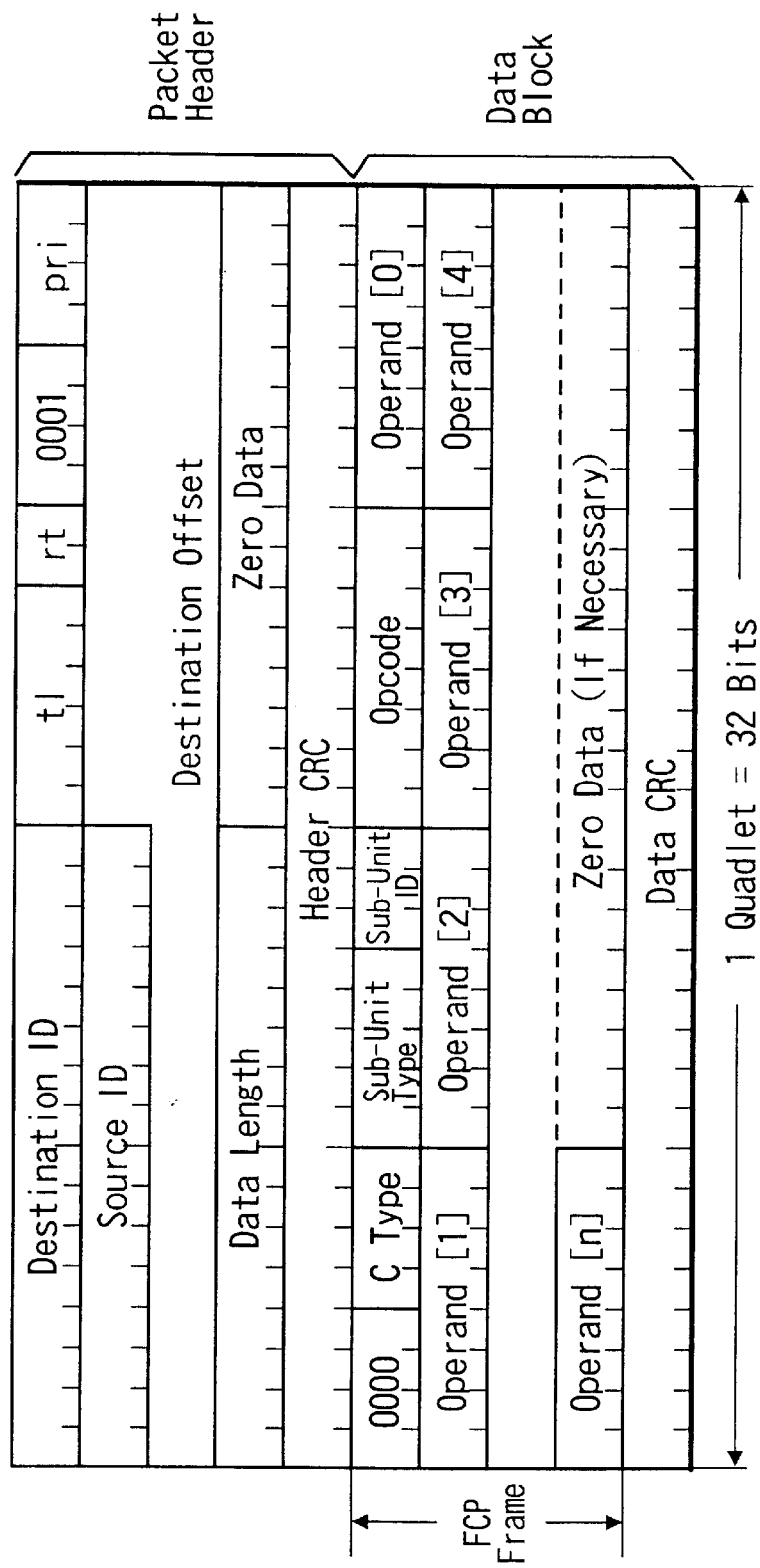
FIG. 16 is an explanatory diagram showing an example of data structure of the AV/C command.

FIG. 16 shows a data structure of packet to be transmitted in asynchronous transmission mode of the AV/C command. The AV/C command set is a command set for controlling the AV apparatus and CTS (command set ID)="0000". The AV/C command frame and response frame are transmitted or received between the nodes using the above described FCP. For the bus and AV apparatus not to be burdened with any load, a response to a command is carried out within 100 ms. As shown in FIG. 16, asynchronous packet data is composed of 32 bits (=1 quddlet) in horizontal direction. A upper row in the same diagram indicates a header portion of packet and a lower row indicates data block. Destination (destination ID) indicates a target.

The CTS indicates command set ID and in the AV/C command set, CTS="0000". In C type/response (c type/response) field, if the packet is a command, it indicates function type of command and if the packet is response, it indicates a processing result of the command. The commands are classified and defined in following four types, (1) command (CONTROL) for controlling the function from outside, (2) command (STATUS) for inquiring status from outside, (3) command (GENERAL INQUIRY (presence or absence of opcode support) and SPECIFIC INQUIRY (presence or absence of opcode and operands support)) for inquiry about control command support from outside, (4) command (NOTIFY) for requesting to notify outside of status change.

The response is sent back depending on command type. The response to control (CONTROL) command includes "not implemented" (NOT IMPLEMENTED), "accepted" (ACCEPTED), "rejected" (REJECTED), and "interim" (INTERIM). The response to status (STATUS) command includes "not implemented" (NOT IMPLEMENTED), "rejected" (REJECTED), "in transition" (IN TRANSITION), "stable" (STABLE). A response to a command (GENERAL INQUIRY and SPECIFIC INQUIRY) for inquiry about presence or absence of command support from outside includes "implemented" (IMPLEMENTED) and "not implemented" (NOT IMPLEMENTED). A response to a command (NOTIFY) for requesting to notify outside of status change includes "not implemented" (NOT IMPLEMENTED), "rejected" (REJECTED), "interim" (INTERIM) and "changed" (CHANGED).

The sub-unit type (sub-unit type) is provided to specify the function in the apparatus and for example, a tape recorder/player (tape recorder/player), tuner (tuner) and the like are allocated. This sub-unit type includes allocation of BBS (bulletin board sub-unit) for publicizing information to other apparatuses as well as allocation of function corresponding to apparatus. To identify when a plurality of sub-units of the same type exist, addressing with the sub-unit ID (sub-unit id) as an identification number is carried out. Opcode (opcode) which is a code for operation indicates a command. Operand (operand) indicates a parameter of a command. A field (additional operands) to be added as required is prepared. Following to operand, 0 data and the like is added as required. Data CRC (Cyclic Reduncy Check) is used for error check during data transmission.

FIG. 17 indicates a concrete example of the AV/C command. A left side of FIG. 17 indicates a concrete example of the c type/response. A upper row of the diagram indicates command and a lower row of the same diagram indicates response. Control (CONTROL), status (STATUS), specific inquiry (SPECIFIC INQUIRY), notify (NOTIFY), and general inquiry (GENERAL INQUIRY) are allocated to "0000", "0001", "0010", "0011" and "0100" respectively. "0101–0111" are reserved for future specification. Further, "not implemented" (NOT IMPLEMENTED), "accepted" (ACCEPTED), "rejected" (REJECTED), "in transition" (IN TRANSITION), "implemented" (IMPLEMENTED/STABLE), "status change" (CHANGED) and "interim" (INTERIM) are allocated to "1000", "1001", "1010", "1011", "1100", "1101", "1111" respectively. "1110" is reserved for future specification.

The center of FIG. 17 indicates a concrete example of the sub-unit type. Video monitor, disc recorder/player, tape recorder/player, tuner, video camera, sub-unit for use as a bulletin board called BBS (Bulletin Board Sub-unit), sub-unit type (vender unique) particular to manufacturer and a particular sub-unit type (sub-unit type extended to next byte) are allocated to "00000", "00011", "00100", "00101", "00111", "01010", "11100", and "11110". Meanwhile, a unit is allocated to "11111" and used to transmit to an apparatus itself. For example, turning on/off power supply is an example of this.

The right of FIG. 17 indicates a concrete example of opecode (operation code: opcode). The opecode table exists for each sub-unit type, indicating an opcode in case where the sub-unit type is a tape recorder/player. The operand is defined for each opcode. A value particular to manufacturer (Vender dependent), search mode, time code, ATN, open memory, memory readout, memory write, load, recording, reproduction and rewind are allocated to "00h", "50h", "51h", "52h", "60h", "61h", "62", "C1h", "C2h", "C3h" and "C4h" respectively.

FIGS. 18A, B show a concrete example of the AV/C command and response. For example, if an instruction for reproduction is sent to a reproducing apparatus as a target (consumer), the controller sends a command shown in FIG. 18A to the target. Because this command uses the AV/C command set, CTS="0000". Because a command (CONTROL) for controlling an apparatus from outside is used for ctype, c type="0000" (see FIG. 17). Because the sub-unit type is a tape recorder/player, sub-unit type= "00100" (see FIG. 17). Because id indicates a case of ID0, id=000. The opecode is "C3h" indicating reproduction (see FIG. 17). The operand is "75h" meaning forward (FORWARD). If reproduction is achieved, the target sends back the response shown in FIG. 20B to the controller. Because "accepted" (accepted) becomes a response, response="1001" (see FIG. 17). Others except the response are the same as FIG. 18A and therefore a description thereof is omitted.

Next, an example of processing for establishing a connection for data transmission between apparatuses connected to the bus 1 based on the IEEE1394 type according to an embodiment of the present invention will be described below.

Figure 19:
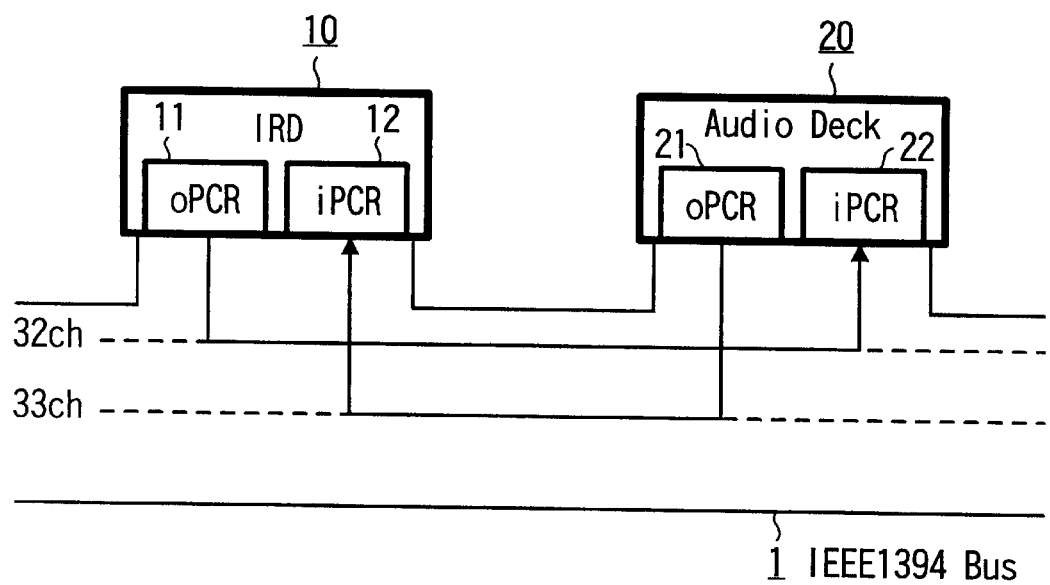
FIG. 19 is a structure diagram showing an example of channel setting condition according, to an embodiment of the present invention.

FIG. 19 is a diagram showing an example of establishment of a connection between the IRD 10 and the deck 20 through the bus 1 based on the IEEE1394 method. Upon this connection establishment, point-to-point (hereinafter referred to as P-P) connection is established among the output plug (oPCR) 11 of the IRD 10, input plug (iPCR) 22 of the deck 20 and a predetermined isochronous channel (32 ch here). Likewise, P-P connection is established among the output plug (oPCR) 21 of the deck 20, the input plug (iPCR) 12 of the IRD 10 and a predetermined isochronous channel (33 ch here). The input plug and output plug used here are virtual plugs for isochronous communication and this virtual plug is specified by the IEC61883-1. The establishment method and release method for the P-P connection use Connection Management Procedure (CMP) specified by IEC61883-1.

Rewriting of a register for establishment and release of the connection are carried out through lock transaction. In this lock transaction, a request dispatching apparatus sets a seemingly current value in parameter [arg value] and a value desired to be rewritten in parameter [data value] and then sends a lock request.

Next, an example of processing for the lock transaction according to this example will be described. Looking at parameter [old value] of lock response which the target apparatus sends out, the current value is stored. Thus, the fact that the current value of the register is stored in parameter[old value] is used to make conditional write succeed -by the read transaction (Read Transaction) and if this value is set in parameter [arg value] requested upon next lock request, a possibility that comparison and exchange [compare & swap] processings succeed. Unless the comparison and exchange [compare & swap] is not carried out by other apparatus, this is sure to succeed.

In the comparison and exchange [compare & swap] of this example, in request parameter [arg value] of a first lock request, the current value is not read out for use but a fixed value estimated to be current value is always used. Even if the first lock request falls short of expectation, the comparison and exchange [compare & swap] processing succeeds by setting up that parameter [old value] to request parameter [arg value] when a second and following lock request is sent.

FIGS. 20A, B show an example of processing of the lock transaction of this embodiment. FIG. 20A shows a register of destination of each request, parameters [arg value], [data value] requested to that register and a current value of the register after that request is made. FIG. 20B is a diagram showing a transmission flow of the processing shown in FIG. 20A. The index number shown in FIG. 20A corresponds to the index number shown in FIG. 20B.

Here, as shown in FIG. 2, for example, the digital satellite broadcasting receiver (Integrated Receiver Decoder: IRD) and the audio deck 20 are connected through the IEEE1394 type bus 1. Then, bi-directional connection is established between the audio deck 20, which is a target apparatus and the IRD 10 through the isochronous channel by the lock transaction requested by the IRD 10. Further, an apparatus having a function called IRM (Isochronous Resource Manager) is connected to the bus 1. This IRM may be an apparatus connected to the bus except the IRD 10 and deck 20 or may be either the IRD 10 or the deck 20. In case of FIG. 20B, the IRM is an apparatus other than the IRD 10 and deck 20.

Figure 21:
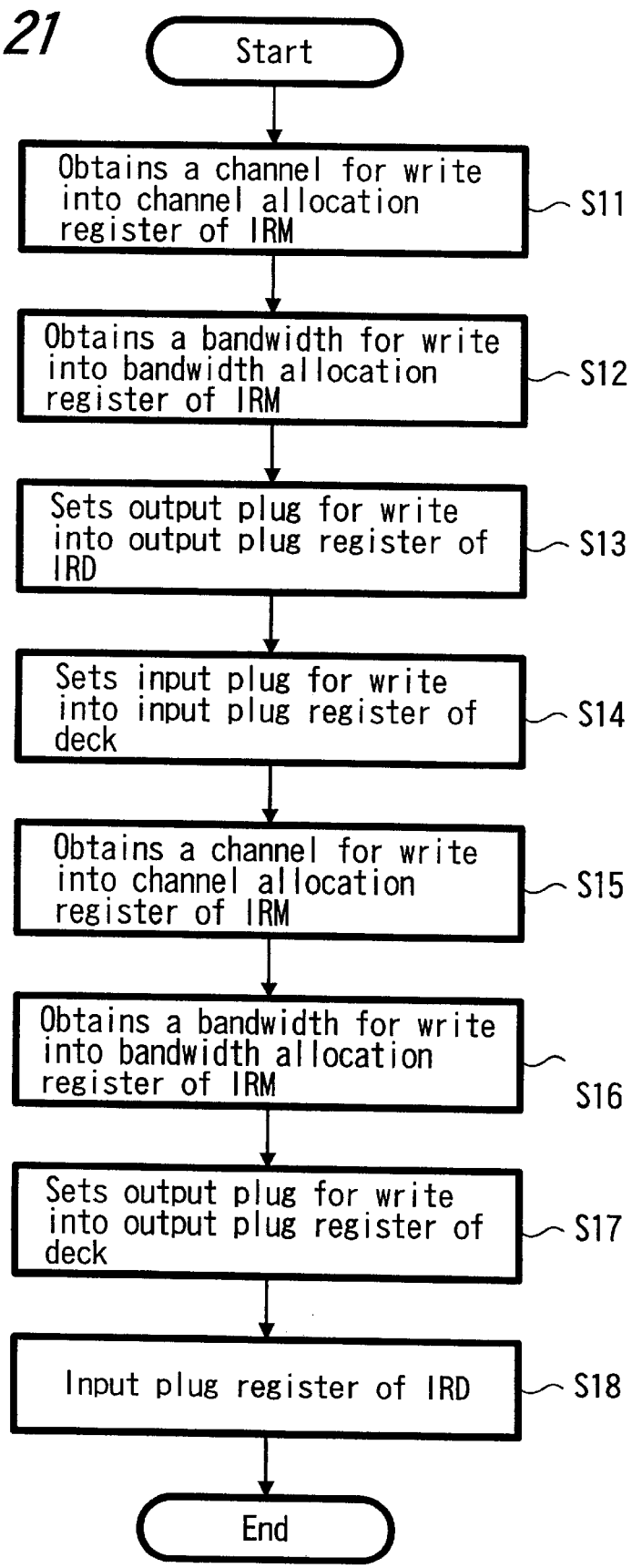
FIG. 21 is a flow chart showing an example of connection setting processing according to a first embodiment of the present invention.

A processing shown in FIGS. 20A, B will be described with reference to a flow chart of FIG. 21. An index shown in FIG. 20A indicates a sequence of packet communication. In the processing of FIG. 20A, if the current values of the parameter [arg value] and register are the same in the same row, write of parameter [data value] into the register succeeds so that a given processing succeeds. Current values of register shown on the right end of FIG. 20A are values after a write instruction is given, that is, a value written after the write succeeds or values held in the register if the write does not succeed.

When a write instruction into the register is dispatch, a parameter [arg value] considered to be a current value of the register and a parameter [data value] desired to be written are sent to a mating. Then, if the current value of the register coincides with the instructed parameter [arg value], the parameter is rewritten to parameter [data value]. Whether or not the rewrite has succeeded can be determined depending on a response from the mating. That is, as shown in FIG. 20B, if a command for requesting for each write is sent as processing of a single index, that response is sent back immediately.

In this example, a fixed value preliminarily set up in each register is used as a parameter [arg value] considered to be current value of the register. More specifically, as index 1, for example, the IRD obtains isochronous transmission channel by writing into the IRM channel allocation register (step S11). Next, as the index 2, a bandwidth in the channel is obtained by writing into the IRM bandwidth allocation register (step S12). Next, by writing into output plug register (oPCR: output Plug Control Register) of the IRD 10 as the index 3, an output plug is set up (step S13). The write into the output plug register of the IRD 10 is processed in the IRD 10. Further, by writing into the input plug register (iPCR: input Plug Control Register) of the audio deck 20 which receives an output from the output plug, as the index 4 an input plug is set up (step S14). Up to here, P-P connection for transmitting data from the IRD 10 to the audio deck 20 is established.

Next, a connection for transmitting data from the audio deck 20 to the IRD 10 is established. That is, as index 5-1, the processing for writing into the channel allocation register of the IRM is executed. Because the same register is written in index 1, the write fails because a different value from the initial value is set up. If the write is executed again as index 5-2 by specifying a value obtained from a response at that time, the write processing succeeds (step S15). Likewise, a processing for writing into the bandwidth allocation register of the IRM is carried out as index 6-1. Because the same register is written in the index 2, that write fails. Then, if the write is executed again as index 6-2 by specifying a value obtained from a response at this time, the write processing succeeds (step S17).

Next, by writing into the output plug register (oPCR) of the deck 20 as index 7, an output plug is set up (step S18). Further, by writing into the input plug register (iPCR) of the IRD 10 which receives an output of the output plug, an input plug is set up (step S19). The write into the input plug register of the IRD 10 is processed in the IRD 10. In this way, P-P connection for transmitting data from the audio deck 20 to the IRD 10 is established.

When each register is rewritten by each index processing, a channel, bandwidth or plug from a value prior to the rewrite of the register up to a rewritten value is secured. And at each step, data transmission for carrying out the write processing into the register is executed by transmitting a packet defined by the AV/C command in asynchronous transmission mode described in FIGS. 9–18(*a, b*). In sending back from a receiver of that command also, a packet of response defined by the AV/C command is transmitted in asynchronous transmission mode.

In this way, point-to-point connection (P-P connection) is established using a register which can be written in by conditional operation called lock transaction. As a result, the write processing into the register with few data transmission is completed so that the P-P connection can be established in a short time.

In the register write processing when the connection is established as described with reference to FIGS. 20A, B, 21, as a requested parameter [arg value] for a first lock request, the current value is not read out for use, but a fixed value considered to be a current value is always used. If that expected value is equal to the current value, the write can be carried out immediately, but the write into the register is carried out directly without carrying out transmission processing for reading out the current value.

In an example shown in FIGS. 20A, B, the expected value is not equal to the current value only in processing of index 5-1 and processing of index 6-1. In that case, by specifying a current value recognized in each index response in index 5-2 and 6-2, the write into the register succeeds. Thus, even if the expected value is not equal to the current value, the processing succeeds by transmitting and receiving the packet twice like conventionally, so that consequently, transmission frequency for the packet required for establishment of a connection can be reduced, so that time necessary for establishing the connection can be reduced.

Next, a second embodiment of the present invention will be described.

In this embodiment also, the processing of its object is processing for transmitting data between two AV apparatuses (IRD 10, audio deck 20) connected through the IEEE1394 type bus 1 like the first embodiment. The configuration of transmission of data through the IEEE1394 type bus 1 and configuration of transmission of command and response using the bus 1 are the same as the configurations described with reference to FIGS. 3–18 in the first embodiment, a description thereof is omitted.

Establishment and release of connection to be carried out between apparatuses already connected to each other through the IEEE1394 type cable is not carried out by connecting or removing a physical cable, but by logical rewrite of register in the bus. The register mentioned here includes a node channel allocation register (CHANNELS AVAILABLE HI register, CHANNELS AVAILABLE LO register) which functions as the IRM, a bandwidth allocation register (BANDWIDTH AVAILABLE register) and input plug register and output plug register for the IRD 10 and deck 20, which are data input/output apparatuses. These registers are registers allowing write by conditional operation called lock transaction (Lock Transaction) as already explained in the first embodiment. That is, it is necessary to send and receive data between a write side and a receive side to decide that the write has succeeded because condition is satisfied when write into the register is tried.

When a connection is established between the IRD 10 and the deck 20 through the bus 1, as shown in FIG. 19, which has been already described, a point-to-point (P-P) connection is established among the output plug (oPCR) 11 of the IRD 10, the input plug (iPCR) 22 of the deck 20 and a predetermined isochronous channel (32 ch here). Likewise, a P-P connection is established among the output plug (oPCR) 21 of the deck 20, the input plug (iPCR) 12 of the IRD 10 and a predetermined isochronous channel (33 ch here).

Register rewrite for such establishment and release of connection is carried out by lock transaction. In this lock transaction, a request dispatching apparatus sets up a seemingly current value in parameter [arg value] and a value desired to be rewritten in parameter [data value] and send lock request.

FIGS. 22A, B show sequences of packet when a connection is established according to this embodiment. FIG. 22A shows registers of destinations for each request, parameters [arg value], [data value] requested to those registers and current values of the registers after those requests are dispatched. FIG. 22B is a diagram showing the processing shown in FIG. 22A by transmission flow, while the index numbers shown in FIG. 22A coinciding with the index numbers shown in FIG. 22B.

A value of the index shown in FIGS. 22A, B indicate just a sequence of packet communication and corresponds to a value of index shown in FIGS. 20A, B according to the above-described first embodiment. A procedure for establishing the connection is basically the same as the procedure of a flow chart shown in FIG. 21 in the first embodiment. In the sequence of each packet, the current value of the register is sent back as a parameter [old value] of the lock response. When write fails in a processing for comparison and exchange [compare & swap], by setting the value of the sent back [old value] value in a parameter [arg value] of a lock request to be sent out to next, a next rewrite succeeds. Here, when a first write is carried out into each register according to this embodiment, an initial value of the parameter [arg value] is set to a fixed in each register preliminarily. Using the fixed value at first is the same as the processing of the above described first embodiment. Whether or not the rewrite succeeds can be determined depending on a response from a mating. That is, as shown in FIG. 22B, if a command for requesting each write-in is sent as a processing for an index, its response is sent back immediately.

The sequence shown in FIGS. 22A, B will be described in detail. The index shown in FIG. 22A indicates the order of packet communication. In the processing of FIG. 22A, if the current values of the parameter [arg value] and register are equal in an index of the same row, the write of the parameter [data value] into the register succeeds, so that a corresponding processing succeeds. The current value of the register shown at the right end of FIG. 22A indicates a value after a write instruction is given, that is, a value written if the write succeeds or a value held in the register if the write fails. FIGS. 22A, B show an example in which all writes succeed.

First, a channel (32 ch) is obtained by writing into the channel allocation register of the IRM as index 1. At this time, as a parameter [arg value] indicating a current value of the register, a fixed value prepared preliminarily for writing the channel allocation register of the IRM is used, for example, a fixed value "FFFFFFFF" is used. When that parameter coincides with the current value, it is rewritten to a parameter [data value]. Meanwhile, values indicated here are hexadecimal numbers each using 4 bytes.

Next, a bandwidth in the channel is obtained by writing into the bandwidth allocation register of the IRM as index 2. As a parameter [arg value] of the current value of a register at this time, a fixed value prepared preliminarily for writing the bandwidth allocation register, for example, a fixed value "00001333" is used. Next, as index 3, by setting the P-P connection counter of the output plug register (oPCR) of the IRD 10 to 1, the output plug is set (the parameter [arg value] is a fixed value prepared preliminarily, for example, a fixed value "80207C12"). Further, as index 4, by setting the P-P connection counter of the input plug register (iPCR) of the audio deck 20 which receives an output from the output plug to 1, an input plug is set ([arg value] is, for example, a fixed value "80200000").

Up to here, the P-P connection for transmitting data from the IRD 10 to the audio deck 20 is established. Although the sequence up to here is the same as the processing described in FIGS. 20A, B according to the first embodiment, in this embodiment, data which is successfully written [data value] (that is, current value of the register) is stored in an apparatus which makes a request (IRD in this example).

According to this embodiment, when establishing a connection for transmitting data from the audio deck 20 to the IRD 10, this stored data [data value] is used. That is, as index 5, the processing for writing into the channel allocation register of the IRM is carried out. Because the same register is written in index 1, the current value set up at that time, "7FFFFFFF" is set as a parameter [arg value] and then, a lock request for writing a parameter [data value] is transmitted. By setting this value and dispatching the lock request, access at this point succeeds unless a corresponding register is rewritten by other apparatus in a time interval from index 1 to index 5.

In next index 6, the processing for writing into the bandwidth allocation register of the IRM is carried out. Because the same register is written in index 2, the current value "000010AB" set up at this time is set up as parameter [arg value] and a lock request is dispatched. By setting this value and dispatching the lock request, the access also succeeds unless a corresponding register is rewritten by other apparatus.

Next, as index 7, by writing 1 into the output plug register (oPCR) of the deck 20, an output plug is set up. Further, by writing 1 into the input plug register (iPCR) of the IRD 10 which receives an output from the output plug, the input plug is set up and then, the P-P connection for transmitting data from the audio deck 20 to the IRD 10 is established. Meanwhile, the write into the output plug register and input plug register of the IRD 10 are processed in the IRD 10.

If writes into the same register occur plural times by carrying out the processing shown in FIGS. 22A, B, a value written at a second or subsequent write becomes a right value unless it is rewritten by other apparatus so that the write succeeds immediately. Therefore, according to the second embodiment, basically, plural transmissions and receptions of packet like transmission and reception of index 5-1, 5-2 and transmission and reception of index 6-1, 6-2 shown in FIGS. 20A, B are not necessary, so that a connection can be established with a simpler processing in a short time.

Figure 23:
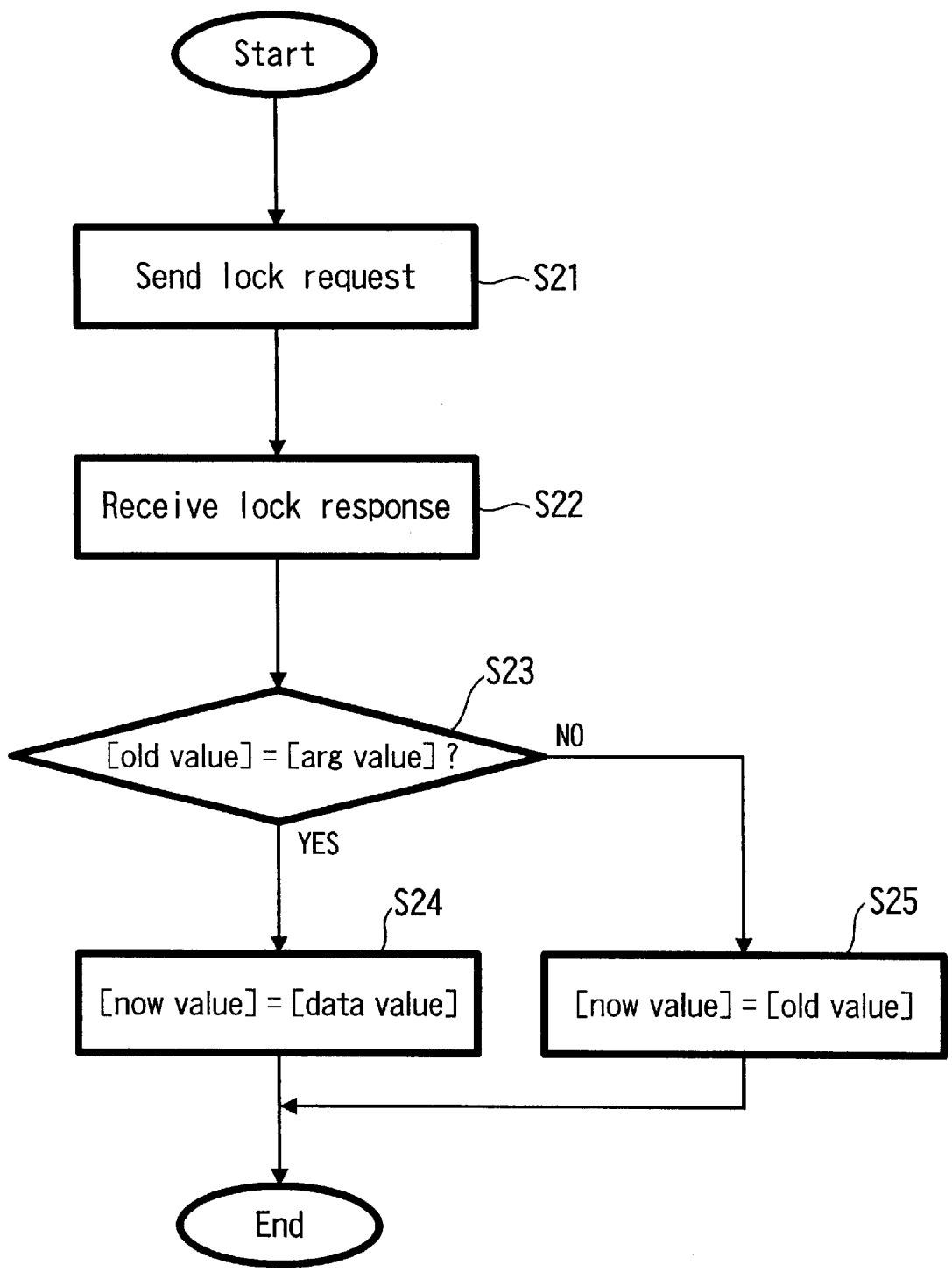
FIG. 23 is a flow chart showing an example of processing for setting a storage value according to an embodiment of the present invention.

An example of processing (this parameter is a storage value for use in the next same register write described above) for setting a parameter (now value) considered to be a current value of each register in the first and second embodiments will be described with reference to a flow chart shown in FIG. 23. First, a lock request is sent (step S21) and a lock response corresponding to that request is received (step S22). Whether or not a parameter [old value] contained in the lock response coincides with a parameter [arg value] contained in the lock request is determined (step S23). If they coincide with each other, it is determined that the rewrite succeeds and the parameter [now value] is set to the current value [data value]. If the values do not coincides and it is determined that the rewrite does not succeed, the parameter [now value] is set to a value of a parameter [old value] contained in a lock response at that time. Then, the parameter [arg value] of a lock request for next access is set to the parameter [now value] set in step S24 or S25.

When the above described bus reset occurs, the node ID of each apparatus on the bus is changed and values of the channel allocation register and bandwidth allocation register of the IRM and input plug register and output plug register of each apparatus are changed to predetermined values specified by each specification. Therefore, when it is detected that the bus reset occurs, the value of the parameter [now value] stored for each register is changed to a value specified by bus reset rule and is set up to the parameter [arg value] of a lock transaction (lock request) which is to be transmitted after the bus reset. Consequently, the rewrite succeeds in a processing of the first comparison and exchange [compare & swap].

Figure 24:
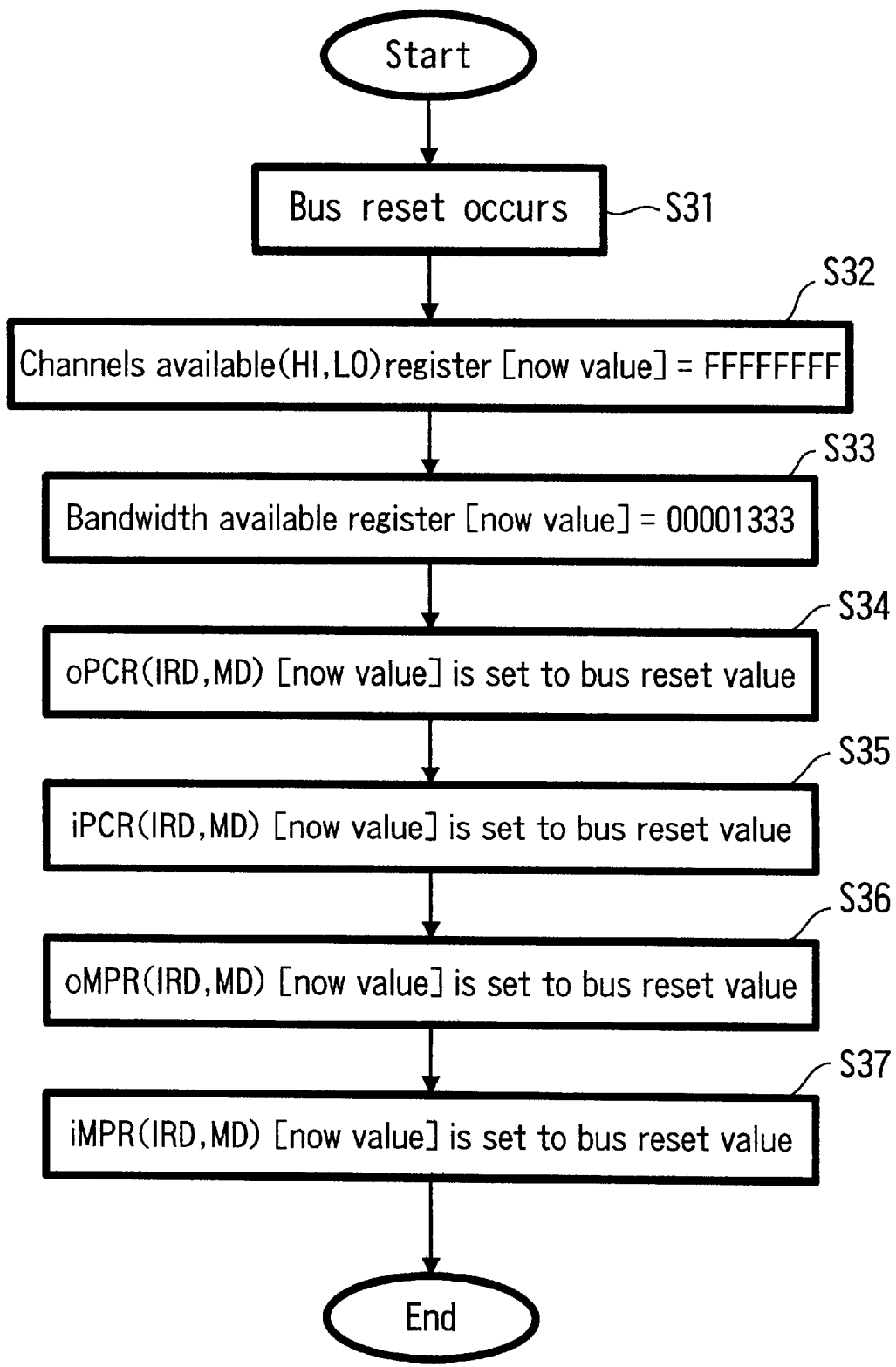
FIG. 24 is a flow chart showing an example of processing for bus reset according to an embodiment of the present invention.

A flow chart of FIG. 24 shows a processing when the bus reset occurs. That is, if it is detected that the bus reset occurs (step S31), the storage value [now value] in the channel allocation register of the IRM is updated to a specified value (step S32). Then, the storage value [now value] of the bandwidth allocation register of the IRM is updated to a specified value (step S33). Further, the storage value [now value] of the oPCR indicating the output plug of each apparatus and the storage value [now value] of the iPCR indicating the input plug are updated to specified values (steps S34, S35). The storage values [now value] of the oMPR (output Master Plug Register) and iMPR (input Master Plug Register) indicating information of the output plug and input plug are changed to specified values (steps S36, S37). By carrying out such processing, the storage value is updated to an appropriate value when the bus reset occurs, so that a possibility that the lock transaction succeeds is intensified.

In registers in which such write is carried out, some register's value depends on a value of other register. For example, if it is intended to make the output plug oPCR in connect condition, it is necessary to obtain a channel and bandwidth from the IRM. This is specified in the IEC61883-1. Therefore, if the output plug oPCR is in connect condition, the isochronous channel outputted from the output plug oPCR must be used and a portion of a corresponding channel in the channel allocation register of the IRM must be in [NOT AVAILABLE] (=0) indicating on use. Therefore, if the bit of a channel corresponding to the channel allocation register of the IRM is made to 0, it can be used for the parameter [arg value] for use upon transmitting a lock request to the channel allocation register next time. The same processing can be carried out for the bandwidth allocation register also.

Figure 25:
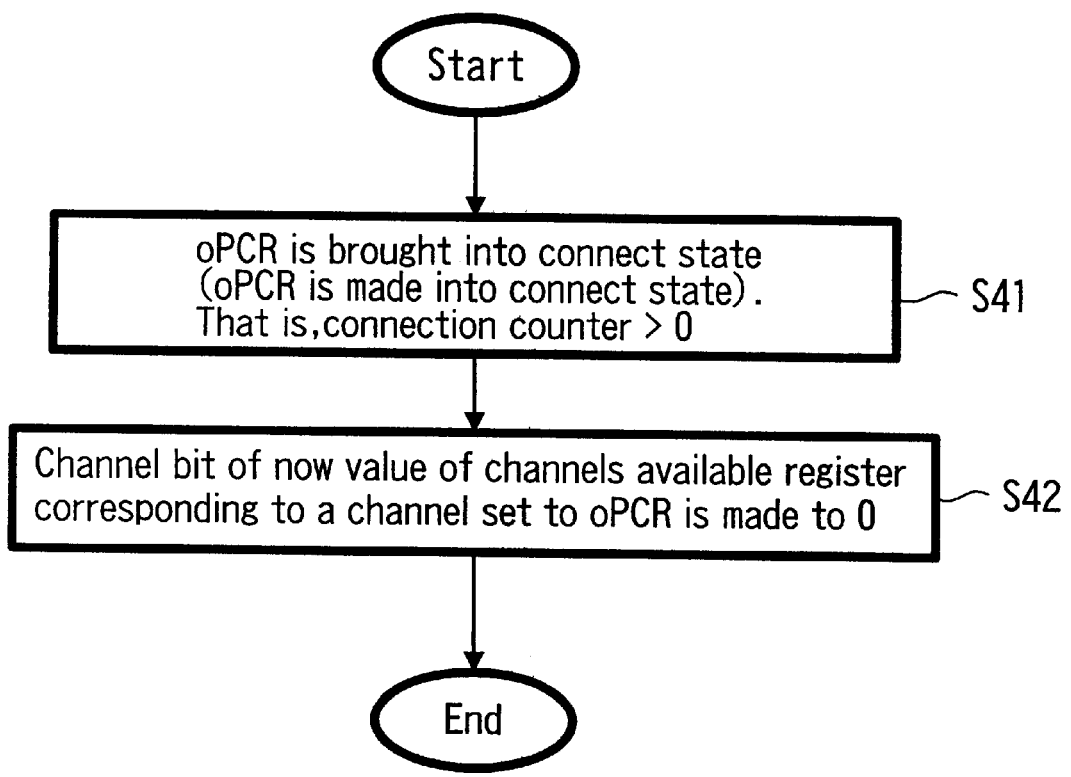
FIG. 25 is a flow chart showing an example of processing for updating a register value depending on other value according to an embodiment of the present invention.

FIG. 25 is a flow chart showing an example of processing in case of setting up a value considered to be a current value of a register (CHANNEL AVAILABLE register) depending on other register (oPCR). That is, when the output plug register (oPCR) is made into connect condition (that is, when it is detected that the connection counter value becomes a value larger than 0)(step S41), [now value] of a register (CHANNELS AVAILABLE register) corresponding to a channel set up in the register (oPCR) is made to 0 (step S42). In this way, in case where the register depends on other value, it is updated favorably.

Although the output plug register, channel and bandwidth have been described here, the value can be updated between registers (dependent on each other) having a relationship.

The processing of estimating the current value of the register is not restricted to the above described processing, but it is permissible to employ other processing such as estimating by a predetermined arithmetic operation or estimating with reference to data in a table prepared for estimation.

Although in the above described embodiments, the processing for writing into the register when the lock transaction is set up has been described, the same processing can be applied for writing into a register to release a set lock transaction. More specifically, when releasing the lock transaction, a rewrite is carried out to return a value of each register written when setting of the lock transaction is requested (if it is not rewritten by carrying out other transaction). Therefore, if the parameter [arg value] estimated to be a current value and a parameter [data value] to be written in are reversed to lock transaction setting time, each register is returned to its original value, thereby releasing the lock transaction.

More specifically, according to the first embodiment, the fixed value set for each register for releasing the lock transaction is specified as the parameter [arg value] and the value for returning the channel or bandwidth from its value to its original value is specified as the parameter [data value]. At this time, the fixed value for releasing the lock transaction may be the same value as a fixed value when the lock transaction is established, however it is recommendable to prepare another fixed value for releasing the lock transaction.

According to the second embodiment, the value written into the register last upon establishment of the lock transaction is stored and when releasing the lock transaction, the stored value is specified as the parameter [arg value] and the value for returning the channel or bandwidth from its value to its original value is specified as the parameter [data value]. As the first value, it is permissible to use the fixed value for releasing the lock transaction without using a value written into the register last upon establishment of the lock transaction.

Although in the above described respective embodiments, the processing in which the digital satellite broadcasting receiver and the audio deck are connected through the bus so as to establish a connection has been described, needless to say, the present invention may be applied to writing (rewriting) in a register with limits between other apparatuses connected through the bus.

Although in the above described respective embodiments, the network constructed via the IEEE1394 type bus has been described, the processing of the present invention may be applied to a processing carried out in a network having other structure.

Although in the above description, it is assumed that the respective apparatuses connected to the bus are set up to carry out each processing, it is permissible to store a program for carrying out the same processing in some providing medium and then, distribute this medium, so that user receiving that medium installs the program in a personal computer or the like so as to achieve the same function.

DESCRIPTION OF REFERENCE NUMERALS

1: IEEE1394 type bus line
10: digital satellite broadcasting receiver (IRD)
11: output plug (oPCR)
12: input plug (iPCR)
20: audio deck
21: output plug (oPCR)
22: input plug (iPCR)
71, 72, 73: AV device
81: physical layer
82: link layer
83: transaction layer
84: serial bus management
85: FCP
86: AV/C command set
91, 93: command register
92, 94: response register
101: antenna
102: monitor
110: receiving module
111: tuner
112: front end portion
113: descramble circuit
114: demultiplexer 114
115: MPEG video decoder
116: NTSC encoder
117: digital/analog conversion circuit
118: MPEG audio decoder
119: digital/analog conversion circuit
120: application module
121: CPU
122: RAM
123: work RAM
124: control panel
130: IEEE1394 module
131: IEEE 1394 interface
201: CPU
202: RAM
203: recording/reproducing system
204: optical pickup
205: magneto-optic disc (mini disc)
206: analog/digital conversion circuit
207: ATRAC encoder
208: ATRAC decoder
209: digital/analog conversion circuit
210: IEEE1394 interface
211: speaker
212: digital audio output terminal
213, 214: analog audio input terminal
215: digital audio input terminal

What is claimed is:

1. A method for performing a locking transaction between apparatuses connected through a predetermined serial communication bus, wherein a register conditionally writable is mounted in a predetermined apparatus connected through said serial communication bus and it is intended to write in said apparatus having said register through said bus from other apparatus, said method comprising the steps of:

requesting said locking transaction with a value supposed to have been written in said register and a value to be written into said register, responding to the request with a current value of said register, updating the value of said register when said value supposed to have been written in the register is identical to said current value in the register, and preparing a value for said value supposed to have been written for a next locking transaction by assigning the updated value when the locking transaction succeeds and assigning the responded value when the locking transaction fails.

2. A method according to claim 1, wherein the serial communication bus is a IEEE 1394 bus.

3. An apparatus for performing a locking transaction between apparatuses connected through a predetermined serial communication bus, wherein a register conditionally writable is mounted in a predetermined apparatus connected through said serial communication bus and it is intended to write in said apparatus having said register through said bus from other apparatus, said apparatus comprising:

means for requesting said locking transaction with a value supposed to have been written in said register and a value to be written into said register;

means for responding to the request with a current value of said register;

means for updating the value of said register when said value supposed to have been written in the register is identical to said current value in the register; and means for preparing a value for said value supposed to have been written for a next locking transaction by assigning the updated value when the locking transaction succeeds and assigning the responded value when the locking transaction fails.

4. An apparatus according to claim 3, wherein the serial communication bus is a IEEE 1394 bus.

* * * * *